US008868724B2

(12) United States Patent
Goodwin et al.

(10) Patent No.: US 8,868,724 B2
(45) Date of Patent: Oct. 21, 2014

(54) SYSTEMS AND METHODS FOR PROVIDING A VIRTUAL APPLIANCE IN AN APPLICATION DELIVERY FABRIC

(75) Inventors: Thomas Goodwin, San Jose, CA (US); Rajiv Mirani, Los Gatos, CA (US); Abhishek Chauhan, Saratoga, CA (US); Frank Suchomel, Morgan Hill, CA (US); Deepak Goel, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 974 days.

(21) Appl. No.: 12/771,580

(22) Filed: Apr. 30, 2010

(65) Prior Publication Data
US 2010/0332617 A1 Dec. 30, 2010

Related U.S. Application Data

(60) Provisional application No. 61/174,699, filed on May 1, 2009.

(51) Int. Cl.
*G06F 15/173* (2006.01)
*G06F 9/455* (2006.01)
*G06F 9/445* (2006.01)

(52) U.S. Cl.
CPC . *G06F 9/455* (2013.01); *G06F 8/60* (2013.01)
USPC ............ 709/224; 709/219; 709/223; 709/226

(58) Field of Classification Search
None
See application file for complete search history.

(56) References Cited

U.S. PATENT DOCUMENTS

| 7,756,972 | B2* | 7/2010 | Ma | 709/224 |
| 2007/0008884 | A1* | 1/2007 | Tang | 370/230 |
| 2007/0130341 | A1* | 6/2007 | Ma | 709/226 |
| 2007/0244987 | A1* | 10/2007 | Pedersen et al. | 709/217 |
| 2009/0106571 | A1* | 4/2009 | Low et al. | 713/310 |
| 2013/0022051 | A1* | 1/2013 | Suganthi et al. | 370/400 |

FOREIGN PATENT DOCUMENTS

WO WO 2008/027768 A2 3/2008

OTHER PUBLICATIONS

J. Kim, S. Jo, J. Song, M. Lim, H. Park: "WADN: Web Application Delivery Network" International Conference on Ubiquitous Computing, ICUC 2003, Oct. 1, 2003, pp. 1-3, Korea retrieved from the Internet: http://nclab.kaist.ac.kr/papers/Conference/ICUC2003-WADN.pdf.
International Preliminary Report on Patentability and Written Opinion issued Nov. 10, 20111 in PCT/US2010/033198.
CN Office Action for Application No. 201080028268.6 dated Dec. 5, 2013.

* cited by examiner

*Primary Examiner* — Mohamed Ibrahim
(74) *Attorney, Agent, or Firm* — Foley & Lardner LLP; Christopher J. McKenna

(57) ABSTRACT

The present disclosure is directed to systems and method for providing a virtual appliance. One or more application delivery controller appliances intermediary to a plurality of clients and a plurality of servers perform a plurality of application delivery control functions on network traffic communicated between the plurality of clients and the plurality of servers. A virtual application delivery controller is deployed on a device intermediary to the plurality of clients and the plurality of servers. The virtual application delivery controller executing on the device performs one or more of the plurality of application delivery control functions on network traffic communicated between the plurality of clients and the plurality of servers.

19 Claims, 19 Drawing Sheets

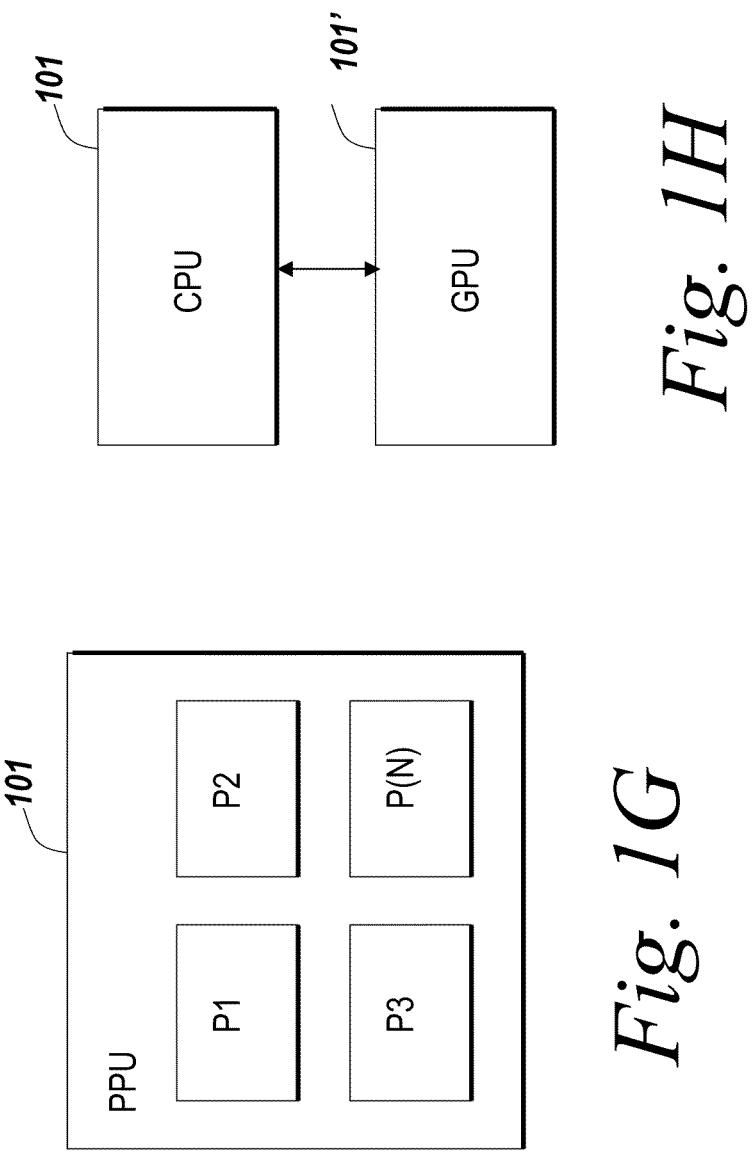

SYSTEMS AND METHODS FOR PROVIDING A VIRTUAL APPLIANCE IN AN APPLICATION DELIVERY FABRIC

RELATED APPLICATION

This application claims priority to and is a non-provisional of U.S. Application No. 61/174,699, "Systems and Methods for Providing a Virtual Appliance in an Application Delivery Fabric," filed May 1, 2009, which is incorporated by reference in its entirety.

FIELD OF THE INVENTION

The present application generally relates to application delivery controllers. In particular, the present application relates to systems and methods for providing one or more virtual application delivery controllers in an application delivery fabric.

BACKGROUND

Providing an application delivery fabric (ADF) whose capacity matches demands for resources presents a challenging dilemma. An ADF designer must estimate an expected level of demand for resources and purchase the corresponding number of application delivery controllers to service this demand, and each of the application delivery controllers can be expensive. If the purchased application delivery controllers cannot service demands for resources, the ADF can become overloaded, resulting in a drop in performance. As a result, additional controllers may need to be purchased. However, should demand drop, controllers in the fabric may be left idle. In this manner, an application delivery fabric can prove to be insufficient for network needs or inefficiently used.

SUMMARY

In the present disclosure, application delivery controllers may be virtualized and deployed in response to ADF demands. A command center may monitor the loads of virtual application delivery controllers. If performance-related metrics of the virtual application delivery controllers indicate the controllers are reaching their capacity or experiencing degradation in performance, the command center may deploy additional virtual application delivery controllers in response. Further, if the same metrics indicate that demand has dropped, the command center may determine if loads may be consolidated on a fewer number of virtual controllers. Then, the command center may undeploy virtual application delivery controllers, thereby making resources available for other uses.

In one aspect, the present disclosure is directed to a method for deploying a virtual application delivery controller. The method includes performing, by one or more application delivery controller appliances intermediary to a plurality of clients and a plurality of servers, a plurality of application delivery control functions on network traffic communicated between the plurality of clients and the plurality of servers. The method also includes deploying a virtual application delivery controller on a device intermediary to the plurality of clients and the plurality of servers. The method also includes performing, by the virtual application delivery controller executing on the device, one or more of the plurality of application delivery control functions on network traffic communicated between the plurality of clients and the plurality of servers.

The virtual application delivery controller may be deployed in a virtualized environment provided by the device. The virtual application delivery controller may be deployed to execute on a virtual machine provided by the device. The virtual application delivery controller may be deployed to execute as a virtual machine on the device. A cloud service may be requested to execute the virtual application delivery controller on resources provided by the cloud service. The virtual application delivery controller may be installed to execute in a non-virtualized environment of the device. A centralized command center may determine to deploy the virtual application delivery controller. The one or more of the plurality of application delivery control functions for the virtual application delivery controller may be configured for deployment. The virtual application delivery controller may perform the one or more of the plurality of application delivery control functions on a first portion of network traffic concurrently to the one or more application delivery controller appliances performing the plurality of application delivery control functions on a second portion of network traffic. The virtual application delivery controller may perform a first application delivery control function on a first portion of network traffic subsequent to an application delivery controller appliance performing a second application delivery control function on the first portion of network traffic.

In another aspect, the present disclosure is directed to a method for managing a plurality of application delivery controllers of an application delivery network. The method includes monitoring, by an application delivery fabric (ADF) manager executing on a device, an application delivery fabric (ADF) network comprising a deployment of a plurality of application delivery controllers intermediary to a plurality of a clients and a plurality of servers. The method also includes determining, by the ADF manager responsive to monitoring, that an operational or performance characteristic of the ADF network fails a corresponding threshold. The method also includes dynamically deploying, by the ADF manager responsive to the determination, a virtual application delivery controller as part of the ADF network.

The ADF manager may establish one or more application delivery controller appliances as part of the ADF network. The ADF manager may establish one or more virtual application delivery controllers as part of the ADF network. The ADF manager may determine, responsive to monitoring, that a number of users of the plurality of application delivery controllers exceeds a threshold. The ADF manager may determine, responsive to monitoring, that a number of connection of the plurality of application delivery controllers exceeds a threshold. The ADF manager may determine, responsive to monitoring, that response times of servers via the plurality of application delivery controllers exceeds a threshold. The ADF manager may determine, responsive to monitoring, that one of a bandwidth or transmission rates via the plurality of application delivery controllers exceeds a threshold. A cloud service may dynamically deploy the virtual application delivery controller. A virtual application delivery controller may be undeployed from the ADF network responsive to monitoring.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 1E-1H are block diagrams of embodiments of a computing device;

Figure 1A:
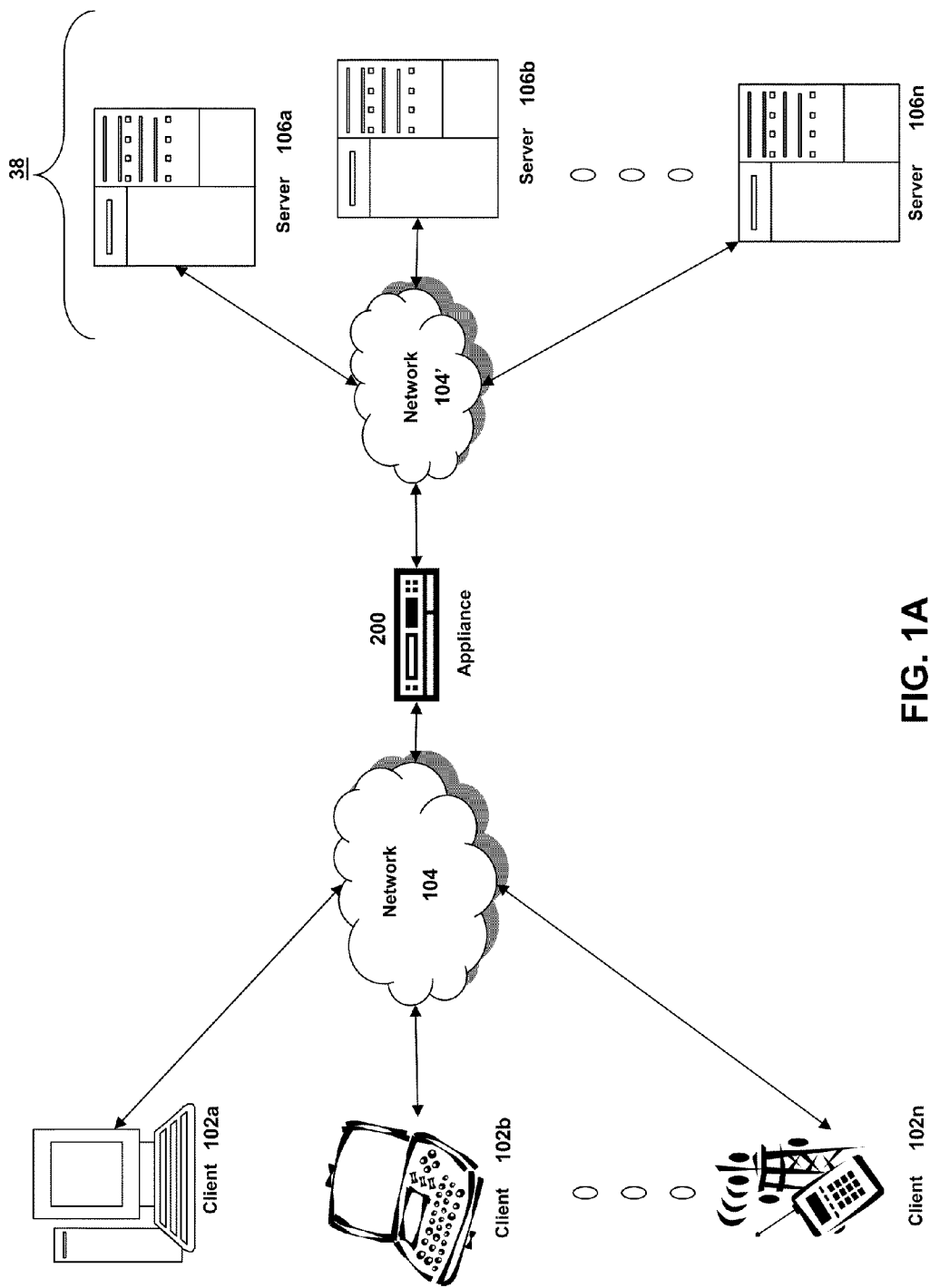
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
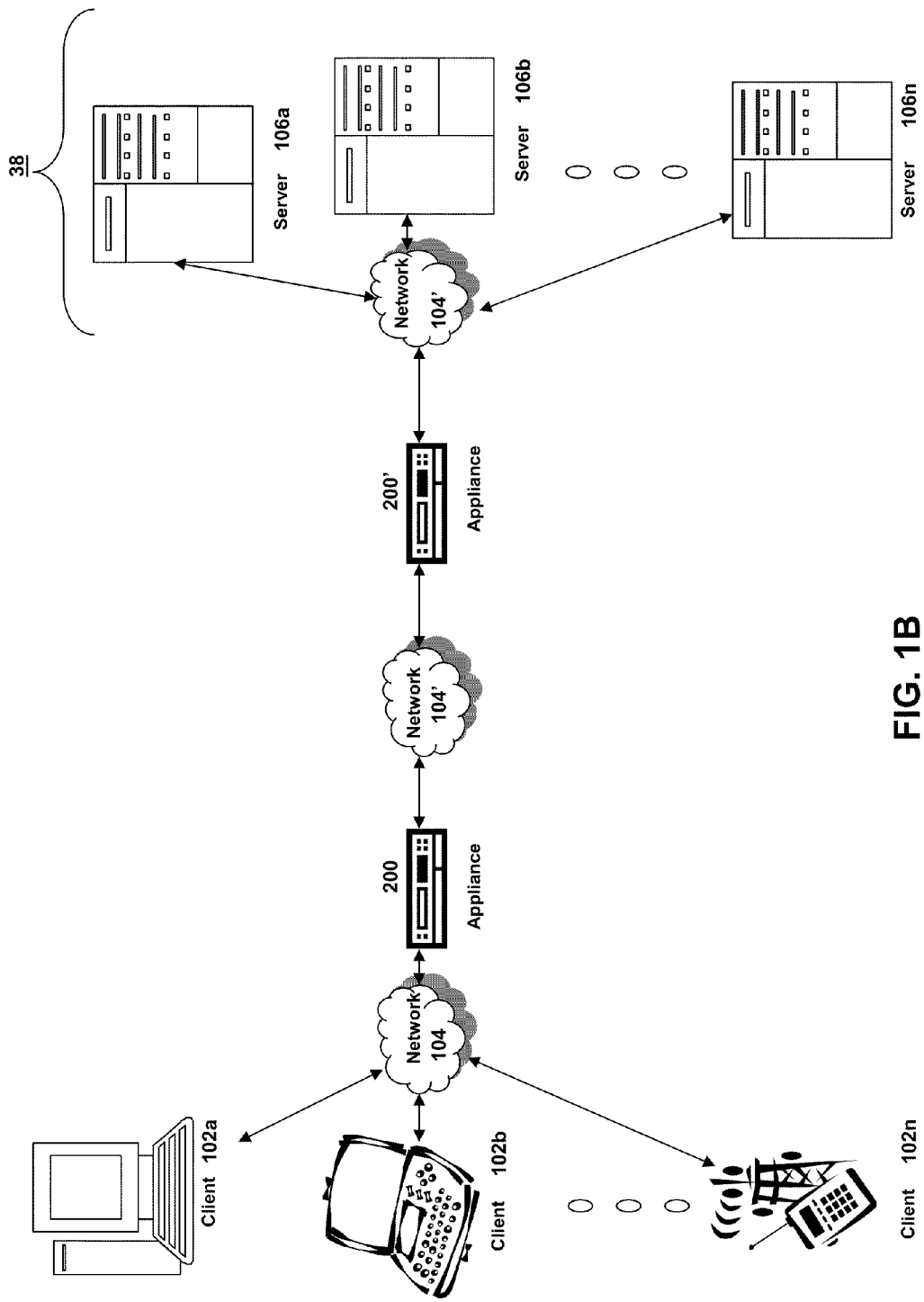
FIG. 1B is a block diagram of an embodiment of an environment for delivering a computing environment from a server to a client via an appliance.
Figure 1C:
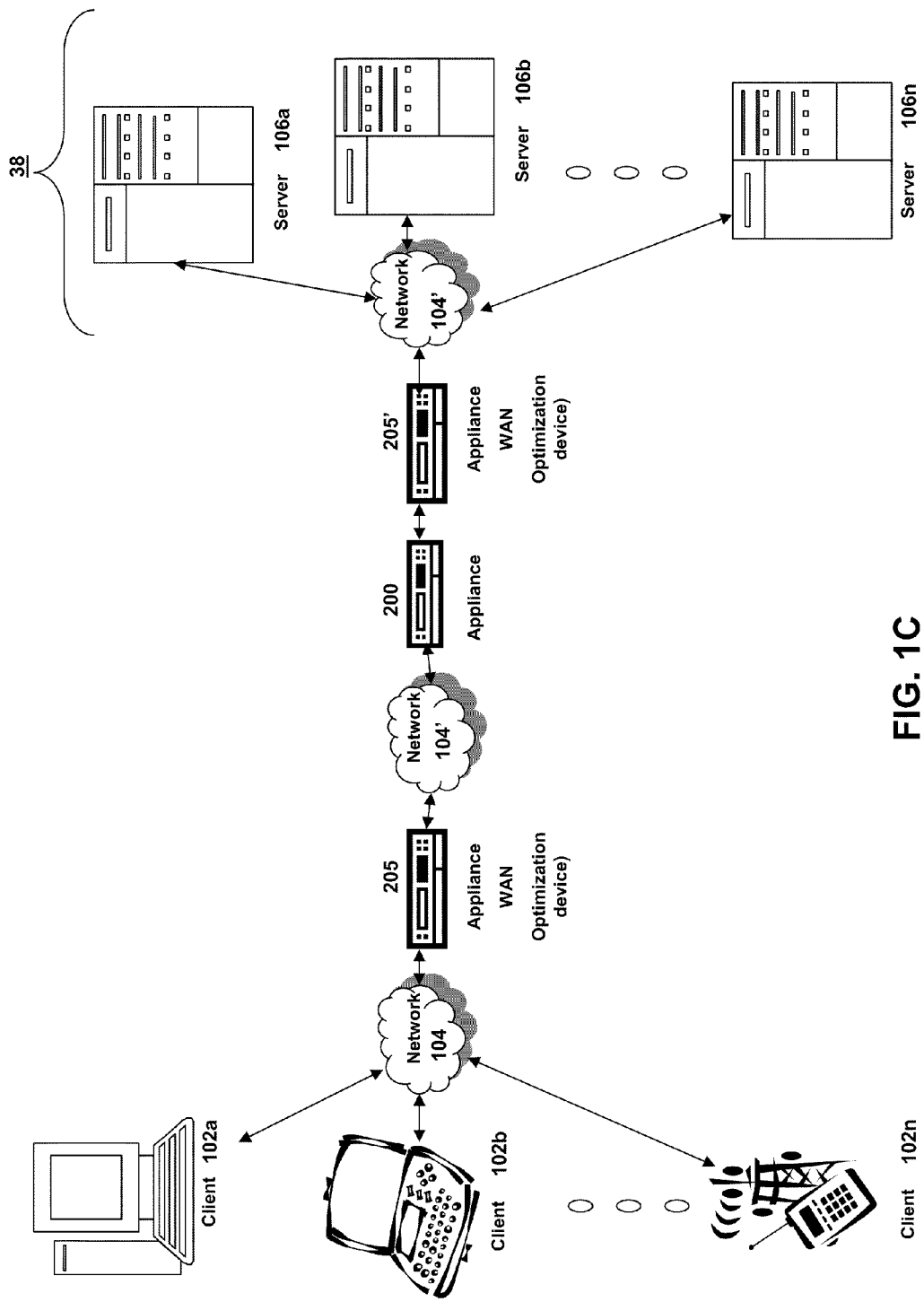
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
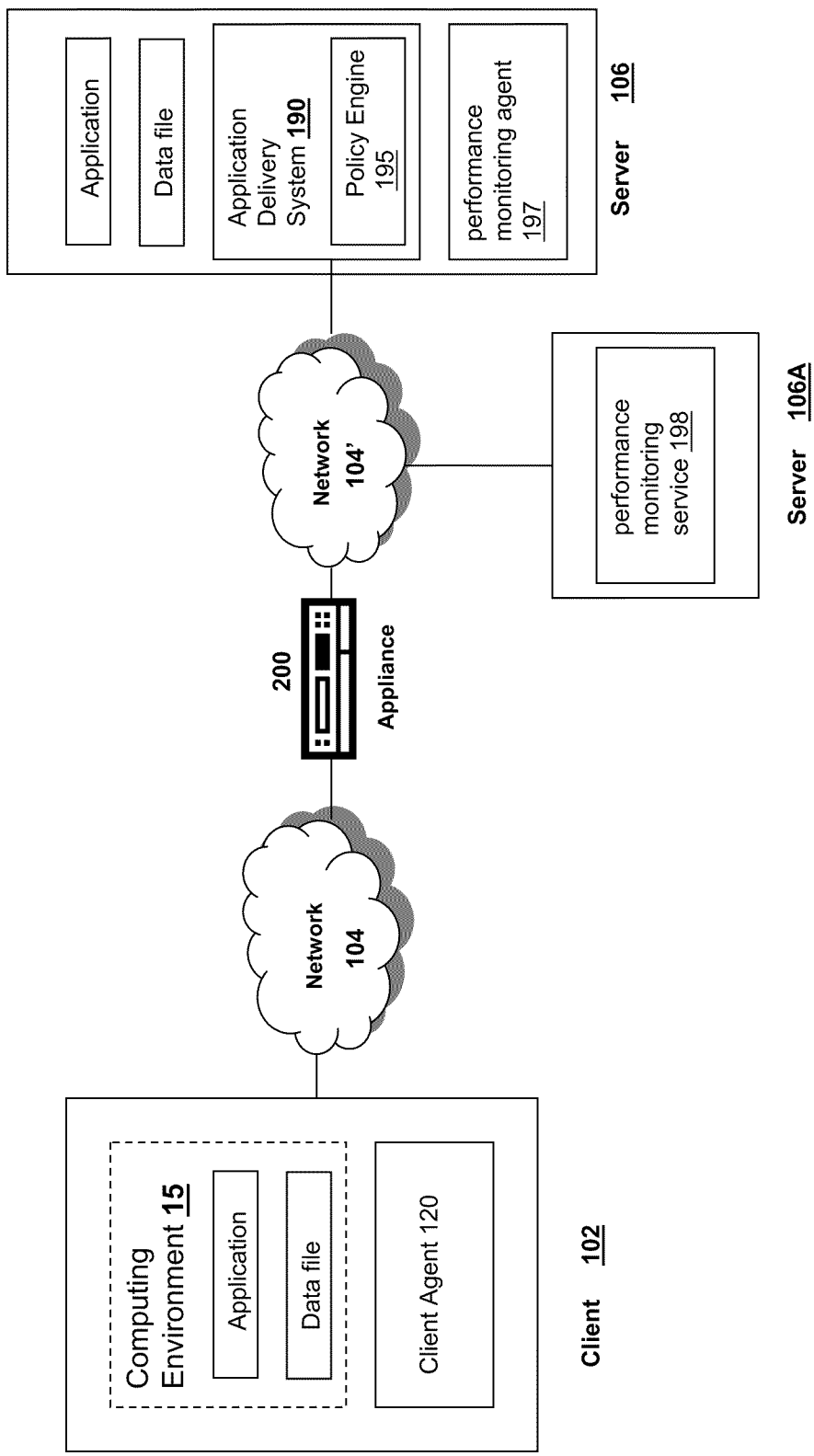
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
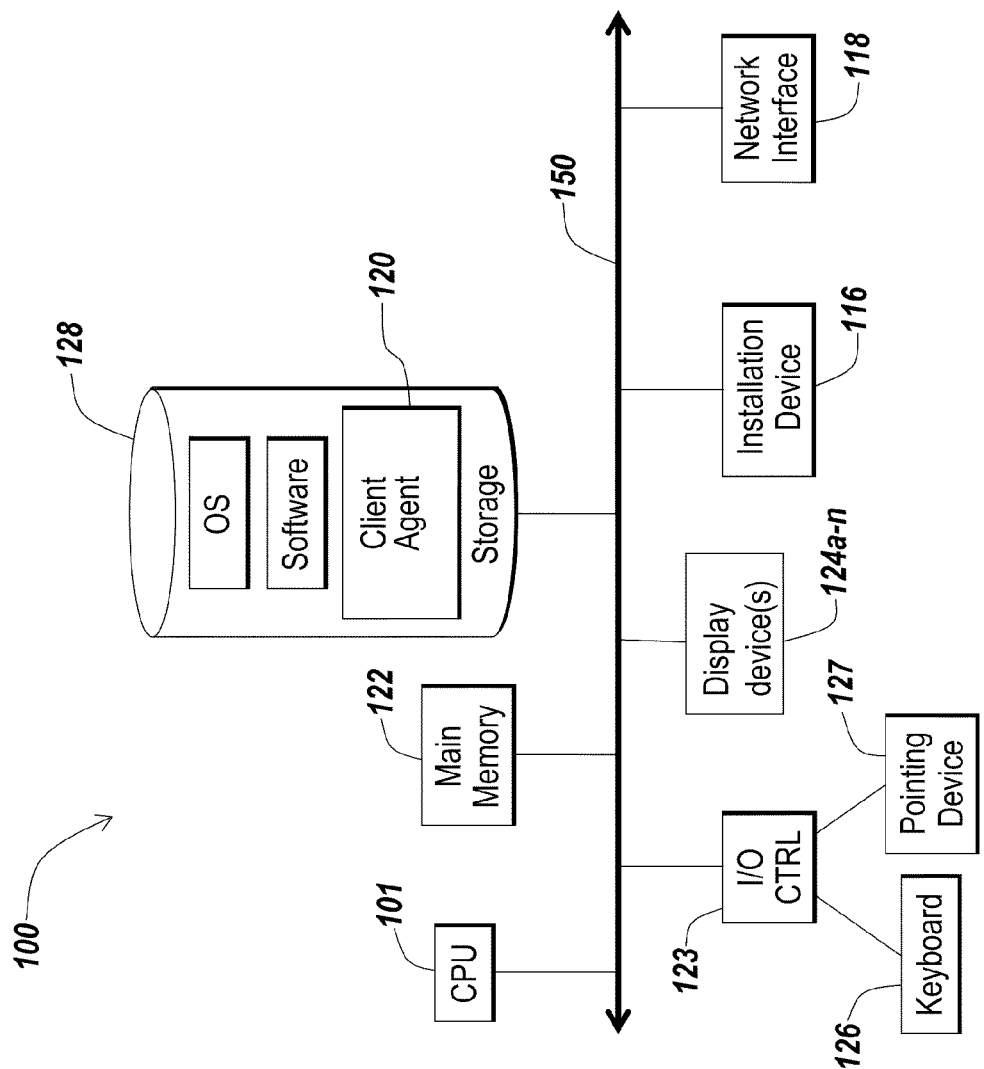
Figure 1F:
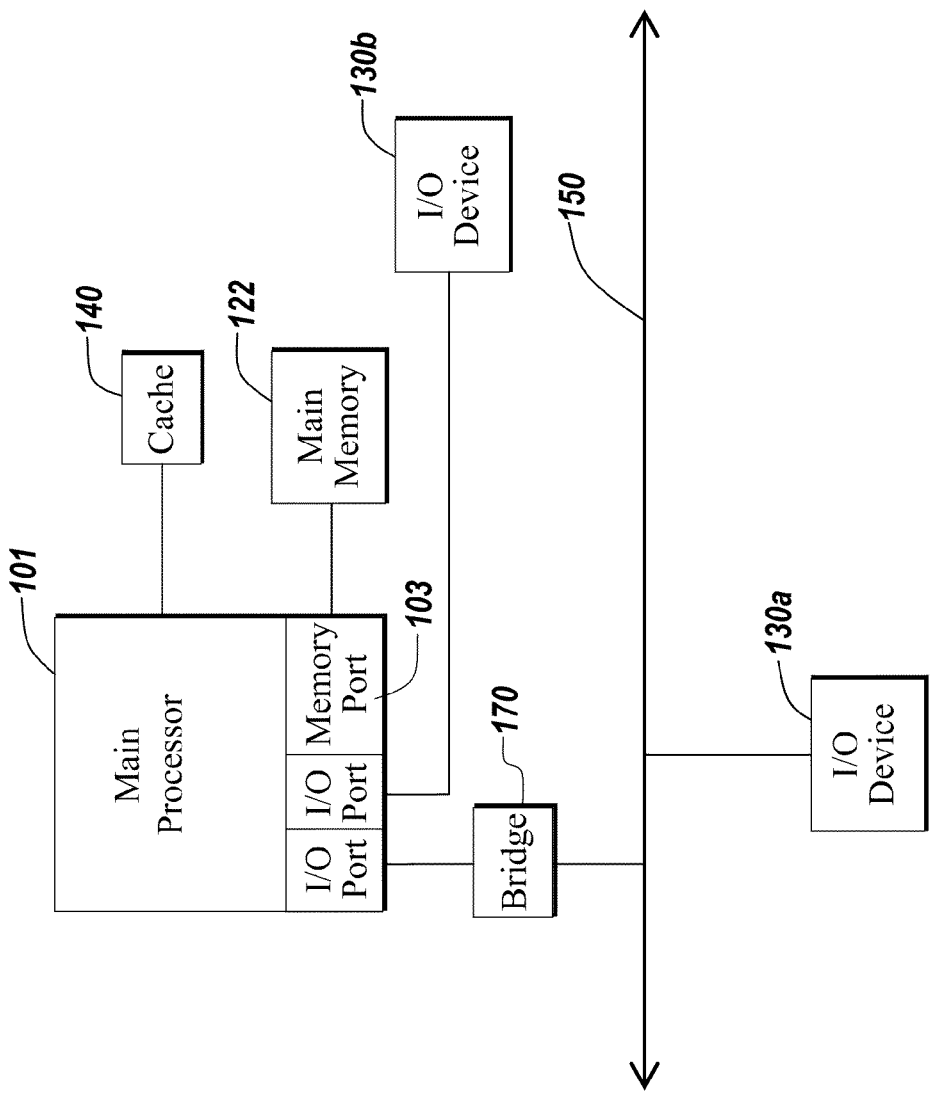

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
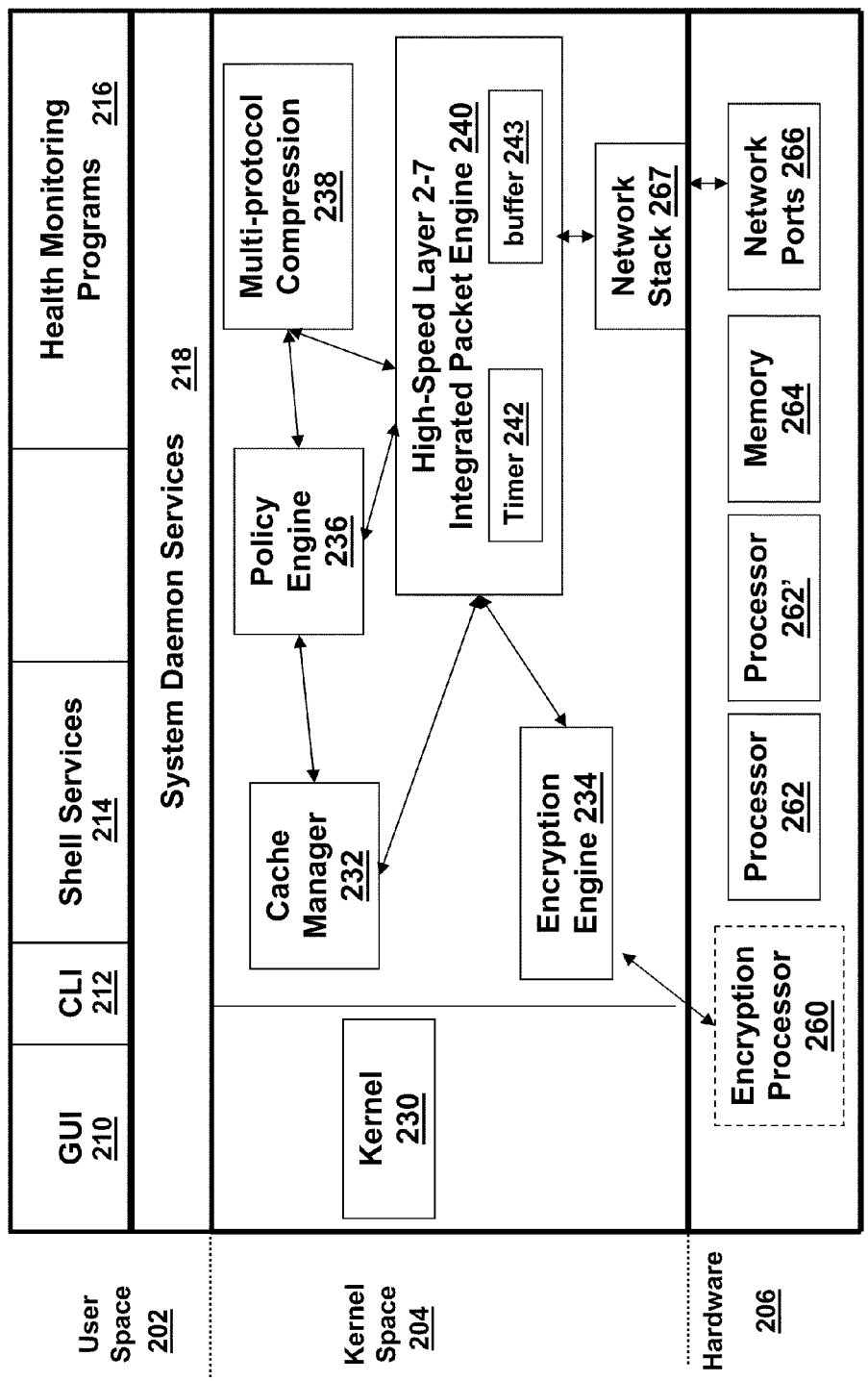
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
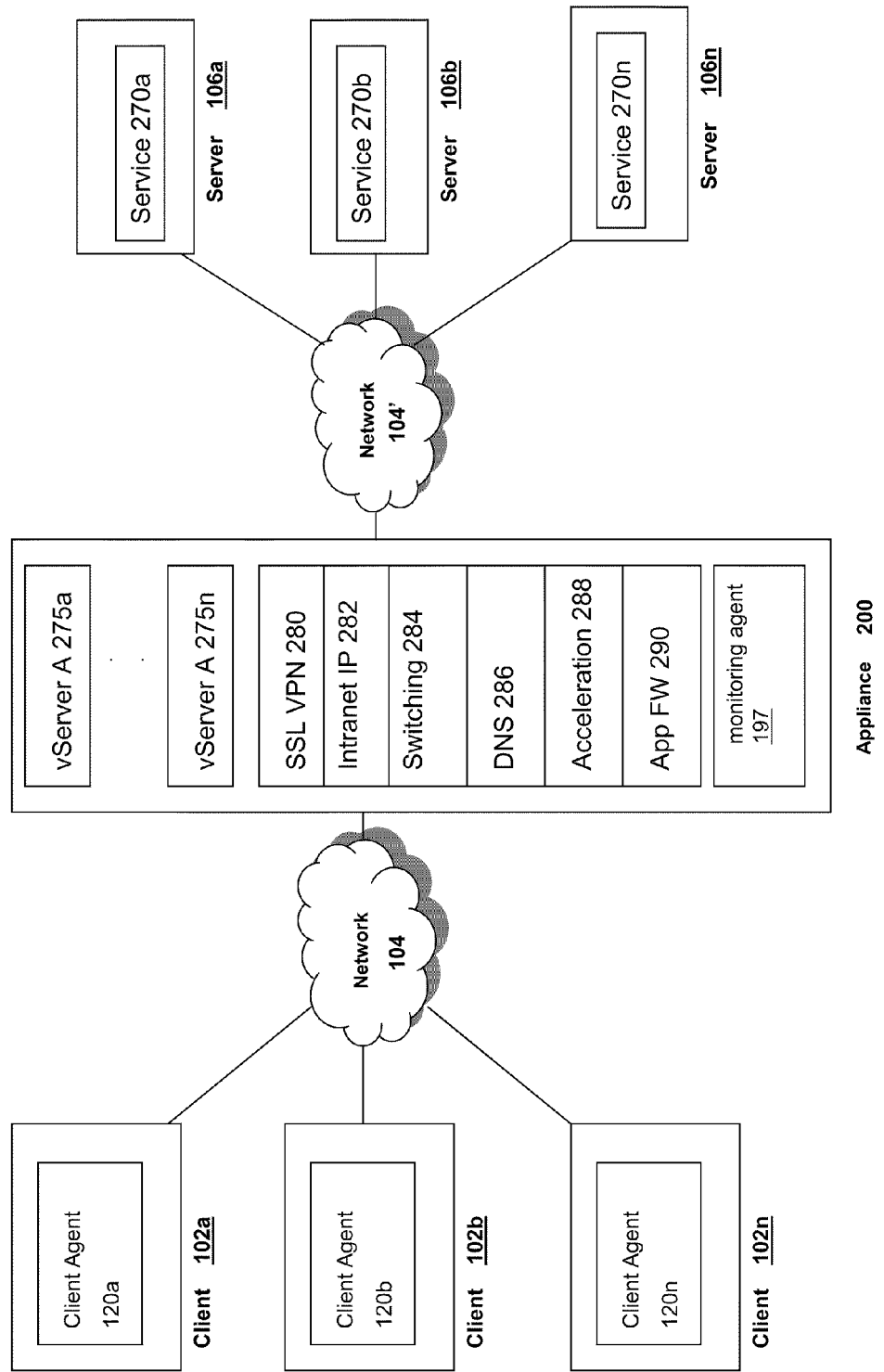
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of tranport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server miscon-figuration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Systems and Methods for Providing Virtual Appliance

Figure 3A:
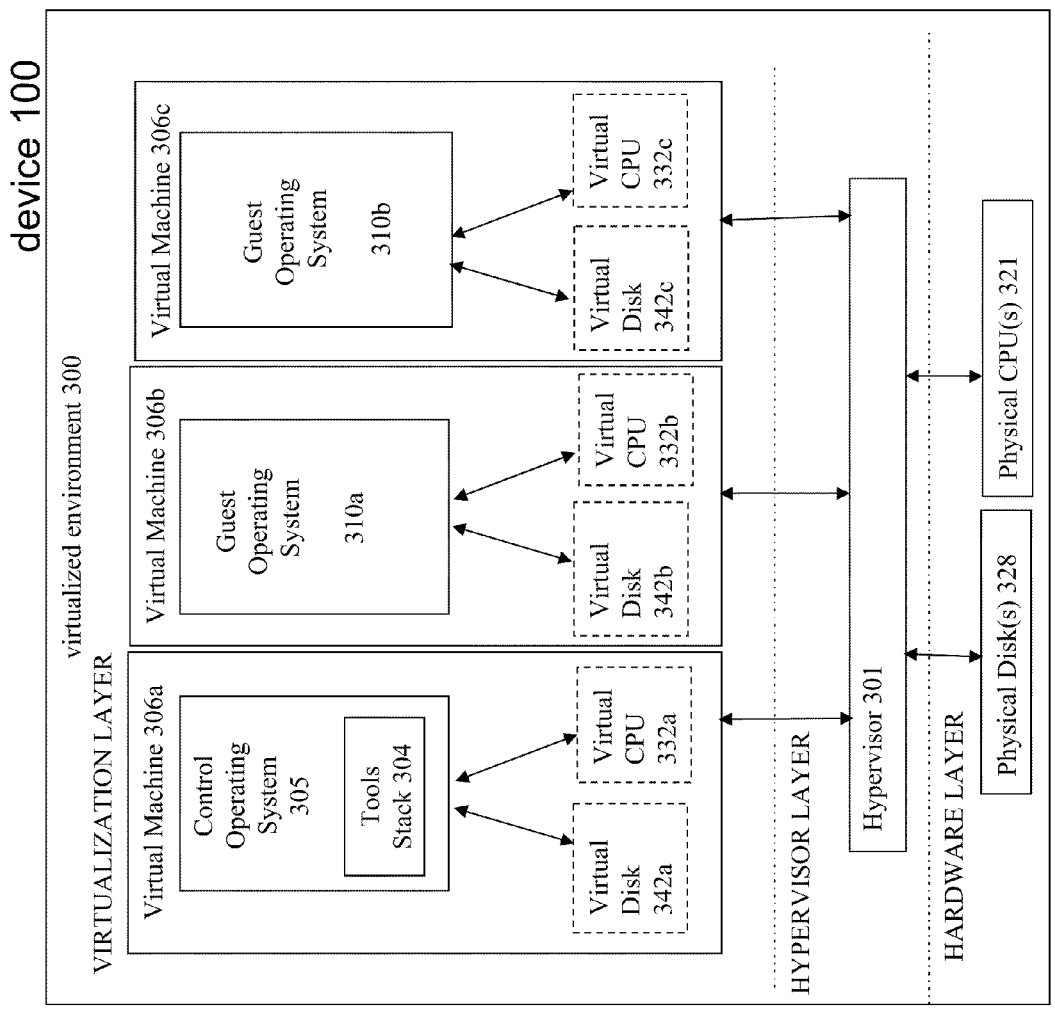
FIG. 3A is a block diagram of an embodiment of a virtualization environment.

Referring now to FIG. 3A, a block diagram depicts one embodiment of a virtualization environment 300. In brief overview, a computing device 100 includes a hypervisor layer, a virtualization layer, and a hardware layer. The hypervisor layer includes a hypervisor 301 (also referred to as a virtualization manager) that allocates and manages access to a number of physical resources in the hardware layer (e.g., the processor(s) 321, and disk(s) 328) by at least one virtual machine executing in the virtualization layer. The virtualization layer includes at least one operating system 310 and a plurality of virtual resources allocated to the at least one operating system 310. Virtual resources may include, without limitation, a plurality of virtual processors 332a, 332b, 332c (generally 332), and virtual disks 342a, 342b, 342c (generally 342), as well as virtual resources such as virtual memory and virtual network interfaces. The plurality of virtual resources and the operating system 310 may be referred to as a virtual machine 306. A virtual machine 306 may include a control operating system 105 in communication with the hypervisor 301 and used to execute applications for managing and configuring other virtual machines on the computing device 100.

In greater detail, a hypervisor 301 may provide virtual resources to an operating system in any manner which simulates the operating system having access to a physical device. A hypervisor 301 may provide virtual resources to any number of guest operating systems 310a, 310b (generally 310). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 301 executes within an operating system executing on a computing device. In one of these embodiments, a computing device executing an operating system and a hypervisor 301 may be said to have a host operating system (the operating system executing on the computing device), and a guest operating system (an operating system executing within a computing resource partition provided by the hypervisor 301). In other embodiments, a hypervisor 301 interacts directly with hardware on a computing device, instead of executing on a host operating system. In one of these embodiments, the hypervisor 301 may be said to be executing on "bare metal," referring to the hardware comprising the computing device.

In some embodiments, a hypervisor 301 may create a virtual machine 306a-c (generally 306) in which an operating system 310 executes. In one of these embodiments, for example, the hypervisor 301 loads a virtual machine image to create a virtual machine 306. In another of these embodiments, the hypervisor 301 executes an operating system 310 within the virtual machine 306. In still another of these embodiments, the virtual machine 306 executes an operating system 310.

In some embodiments, the hypervisor 301 controls processor scheduling and memory partitioning for a virtual machine 306 executing on the computing device 100. In one of these embodiments, the hypervisor 301 controls the execution of at least one virtual machine 106. In another of these embodiments, the hypervisor 301 presents at least one virtual machine 306 with an abstraction of at least one hardware resource provided by the computing device 100. In other embodiments, the hypervisor 301 controls whether and how physical processor capabilities are presented to the virtual machine 306.

A control operating system 305 may execute at least one application for managing and configuring the guest operating systems. In one embodiment, the control operating system 305 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 301 executes the control operating system 305 within a virtual machine 306 created by the hypervisor 301. In still another embodiment, the control operating system 305 executes in a virtual machine 306 that is authorized to directly access physical resources on the computing device 100. In some embodiments, a control operating system 305a on a computing device 100a may exchange data with a control operating system 305b on a computing device 100b, via communications between a hypervisor 301a and a hypervisor 301b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 305 executes in a virtual machine 306 that is authorized to interact with at least one guest operating system 310. In another embodiment, a guest operating system 310 communicates with the control operating system 305 via the hypervisor 301 in order to request access to a disk or a network. In still another embodiment, the guest operating system 310 and the control operating system 305 may communicate via a communication channel established by the hypervisor 301, such as, for example, via a plurality of shared memory pages made available by the hypervisor 301.

In some embodiments, the control operating system 105 includes a network back-end driver for communicating directly with networking hardware provided by the computing device 100. In one of these embodiments, the network back-end driver processes at least one virtual machine request from at least one guest operating system 110. In other embodiments, the control operating system 305 includes a block back-end driver for communicating with a storage element on the computing device 100. In one of these embodiments, the block back-end driver reads and writes data from the storage element based upon at least one request received from a guest operating system 310.

In one embodiment, the control operating system 305 includes a tools stack 304. In another embodiment, a tools stack 304 provides functionality for interacting with the hypervisor 301, communicating with other control operating systems 305 (for example, on a second computing device 100b), or managing virtual machines 306b, 306c on the computing device 100. In another embodiment, the tools stack 304 includes customized applications for providing improved management functionality to an administrator of a virtual machine farm. In some embodiments, at least one of the tools stack 304 and the control operating system 305 include a management API that provides an interface for remotely configuring and controlling virtual machines 306 running on a computing device 100. In other embodiments, the control operating system 305 communicates with the hypervisor 301 through the tools stack 104.

In one embodiment, the hypervisor 301 executes a guest operating system 310 within a virtual machine 306 created by the hypervisor 301. In another embodiment, the guest operating system 310 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 310, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 301. In such an embodiment, the driver may be aware that it executes within a virtualized environment. In another embodiment, the guest operating system 310, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 305, as described above.

Figure 3B:
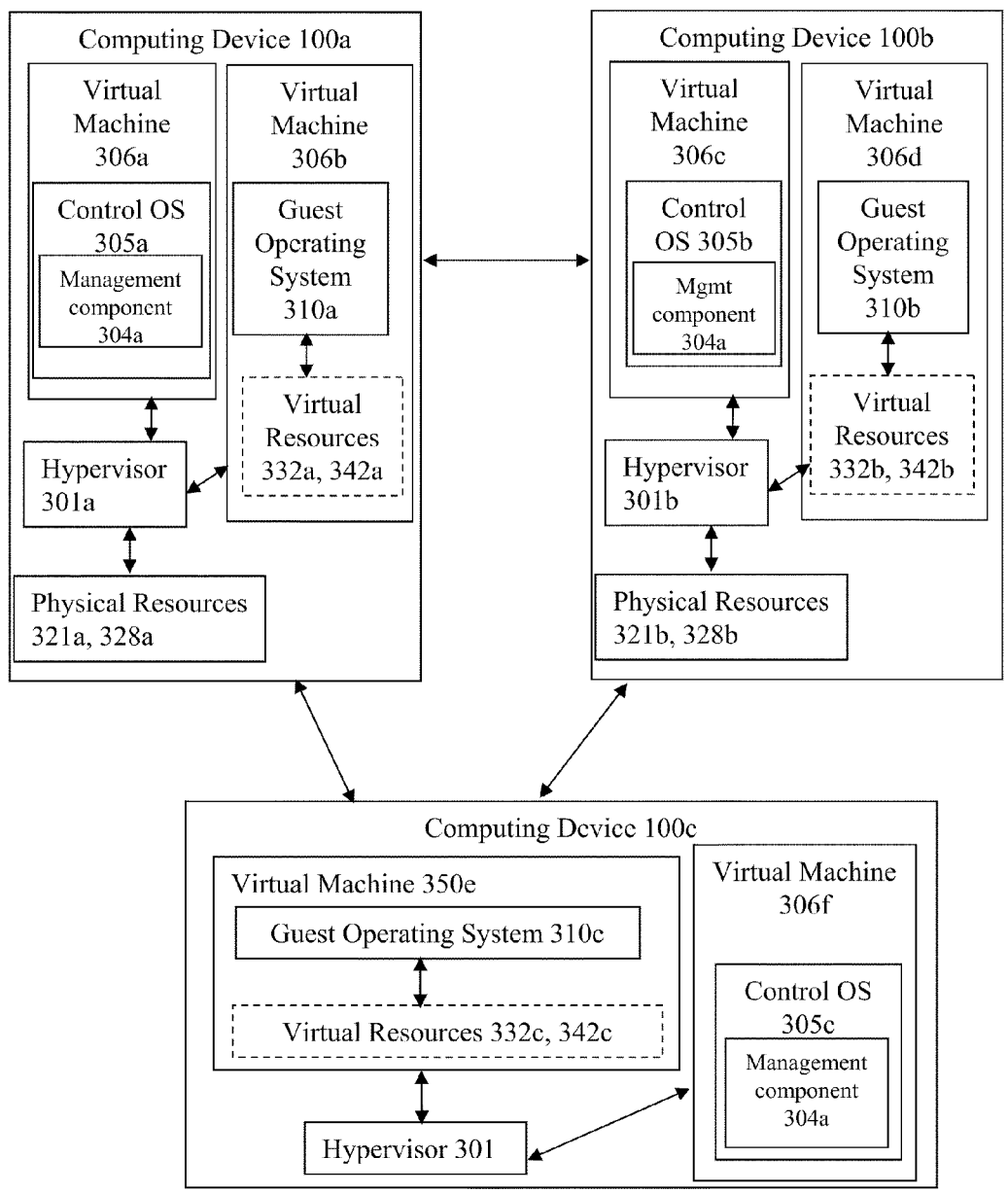
FIG. 3B is a block diagram of another embodiment of a virtualization environment.

Referring now to FIG. 3B, a block diagram depicts one embodiment of a plurality of networked computing devices in a system in which at least one physical host executes a virtual machine. In brief overview, the system includes a management component 304 and a hypervisor 301. The system includes a plurality of computing devices 100, a plurality of virtual machines 306, a plurality of hypervisors 301, a plurality of management components referred to as tools stacks 304, and a physical resource 321, 328. The plurality of physical machines 100 may each be provided as computing devices 100, described above in connection with FIGS. 1E-1H and 3A.

In greater detail, a physical disk 328 is provided by a computing device 100 and stores at least a portion of a virtual disk 342. In some embodiments, a virtual disk 342 is associated with a plurality of physical disks 328. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 306 executes is referred to as a physical host 100 or as a host machine 100.

The hypervisor executes on a processor on the computing device 100. The hypervisor allocates, to a virtual disk, an amount of access to the physical disk. In one embodiment, the hypervisor 301 allocates an amount of space on the physical disk. In another embodiment, the hypervisor 301 allocates a plurality of pages on the physical disk. In some embodiments, the hypervisor provisions the virtual disk 342 as part of a process of initializing and executing a virtual machine 350.

In one embodiment, the management component 304a is referred to as a pool management component 304a. In another embodiment, a management operating system 305a, which may be referred to as a control operating system 305a, includes the management component. In some embodiments, the management component is referred to as a tools stack. In one of these embodiments, the management component is the tools stack 304 described above in connection with FIG. 3A. In other embodiments, the management component 304 provides a user interface for receiving, from a user such as an administrator, an identification of a virtual machine 306 to provision and/or execute. In still other embodiments, the management component 304 provides a user interface for receiving, from a user such as an administrator, the request for migration of a virtual machine 306b from one physical machine 100 to another. In further embodiments, the management component 104a identifies a computing device 100b on which to execute a requested virtual machine 306d and instructs the hypervisor 301b on the identified computing device 100b to execute the identified virtual machine; such a management component may be referred to as a pool management component.

Figure 4A:
FIG. 4A is a block diagram of an embodiment of a virtualized appliance.
Figure 4B:
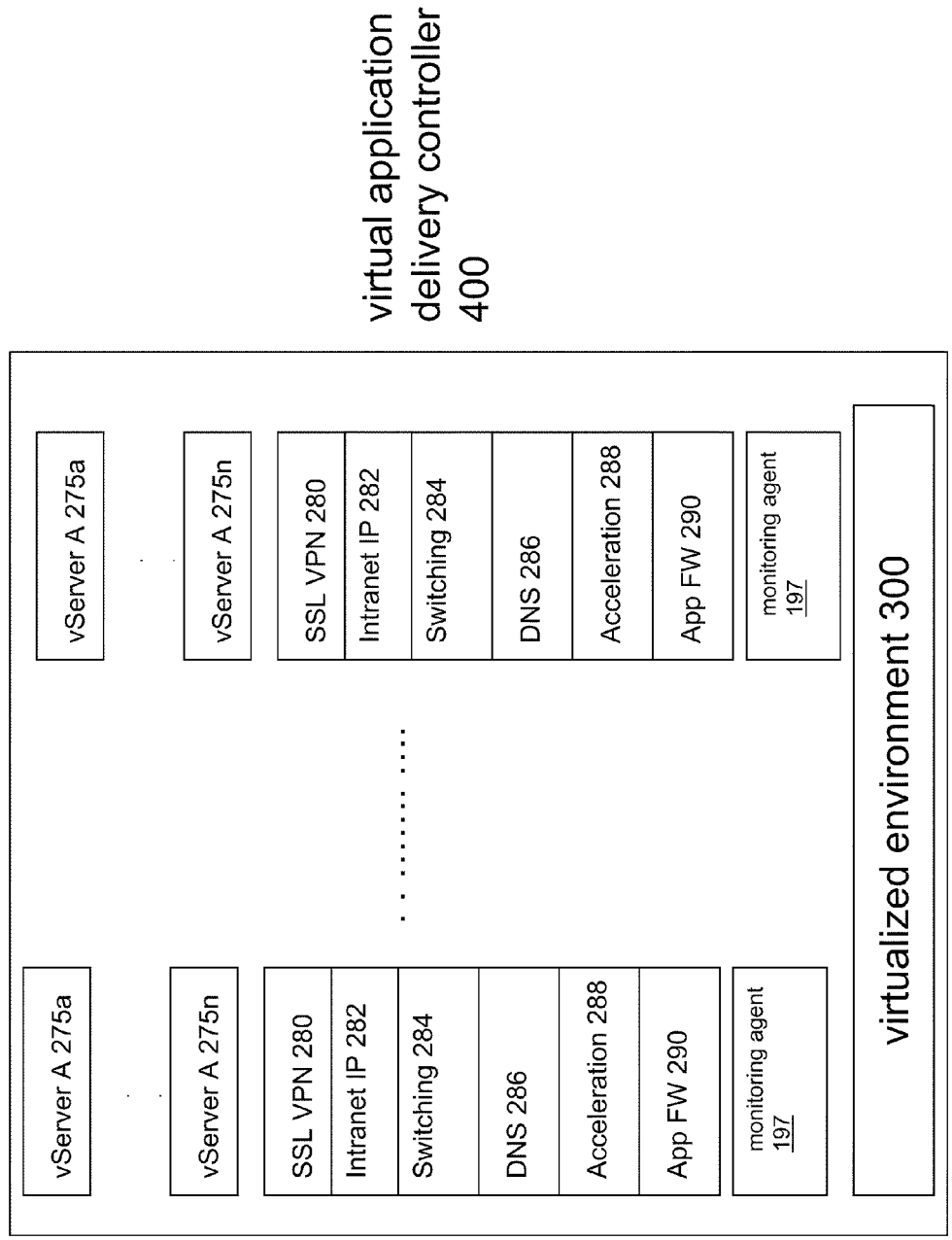
FIG. 4B is a block diagram of another embodiment of a virtualized appliance.

Referring now to FIGS. 4A and 4B, some exemplary embodiments of a virtual application delivery controller 400 (also referred to herein as a "virtual appliance") are shown and described. In brief overview, any of the functionality and/or embodiments of the appliance 200 (i.e., an application delivery controller) described in connection with FIGS. 2A and 2B may be deployed in any embodiment of the virtualized environment 300 described above in connection with FIGS. 3A and 3B. Instead of the functionality of the application delivery controller being deployed in the form of an appliance 200, such functionality may be deployed in a non-virtualized or virtualized environment 300 on any computing device 100, such as a server 106. In particular, the functionality may be deployed through software modules or components that execute on the server 106.

Referring now to FIG. 4A, an exemplary embodiment of a virtual appliance 400 operating on a hypervisor 301 of a server 106 is shown and described. As with the appliance 200 of FIGS. 2A and 2B, the virtual appliance 400 may provide functionality for availability, performance, offload and security. For availability, the virtual appliance 400 may perform load balancing between layers 4 and 7 of the network and/or may perform intelligent service health monitoring. For performance increases via network traffic acceleration, the virtual appliance 400 may perform caching and/or compression. To offload processing of any servers 106, the virtual appliance 400 may perform connection multiplexing and pooling and/or SSL processing. For security, the virtual appliance 400 may perform any of the application firewall functionality and/or SSL VPN function of appliance 200.

Any of the functionality of the appliance 200 as described in connection with FIG. 2A may be packaged, combined, designed or constructed in a form of the virtual appliance delivery controller 400 deployable as one or more software modules or components. For example, with reference to FIG. 2A, any of the cache manager 232, policy engine 236, compression 238, encryption engine 234, packet engine 240, GUI 210, CLI 212, shell services 214 and health monitoring programs 216 may be designed or constructed as a software module or component. These software modules or components may be provided in the form of an installation package to install on a computing device. When deployed on a computing device, the virtualized appliance delivery controller 400 may run on an operating system of the computing device and/or in a virtualized environment 300. The virtualized appliance delivery controller 400 may execute in a virtualized environment 300 or non-virtualized environment on any server 106. In the former situations, instead of using the encryption processor 260, processor 262, memory 264 and network stack 267 of the appliance 200, the virtualized appliance 400 may use any of these resources as provided by the virtualized environment 300 or as otherwise available on a server 106.

Referring now to FIG. 4B, another embodiment of the virtualized application delivery controller 400 is shown and described. In brief overview, any one or more vServers 275A-275N may be operating or executing in a virtualized environment 300 of any type of computing device 100, such as an off-the-shelf server 106. Any of the modules or functionality of the appliance 200 described in connection with FIG. 4B may be designed or constructed to operate in either a virtualized or non-virtualized environment of a server 106. Any of the vServer 275, SSL VPN 280, Intranet UP 282, Switching 284, DNS 286, acceleration 288, App FW 280 and monitoring agent 197 may be packaged, combined, designed or constructed in a form of application delivery controller 400 deployable as one or more software modules or components executable on a computing device and/or virtualized environment 300 of such a device.

In various embodiments, a server 106 may execute multiple virtual appliances 400. For example, the server 106 may execute multiple virtual machines 306a-306n in the virtualized environment 300, and each virtual machine 306 may run the same or different embodiment of the virtual appliance 400. Further, each virtual machine 306 may run one or more virtual appliances 400. In multi-core processing systems, a single core may execute each virtual machine 306, or execution of the virtual machines 306 may be dynamically allocated across multiple cores. In some embodiments, the server 106 may execute one or more virtual appliances 400 on one or more virtual machines 306 on a core of a multi-core processing system. In additional embodiments, the server 106 may execute one or more virtual appliances 400 on one or more virtual machines 306 on each core of the multi-core processing system.

Figure 5A:
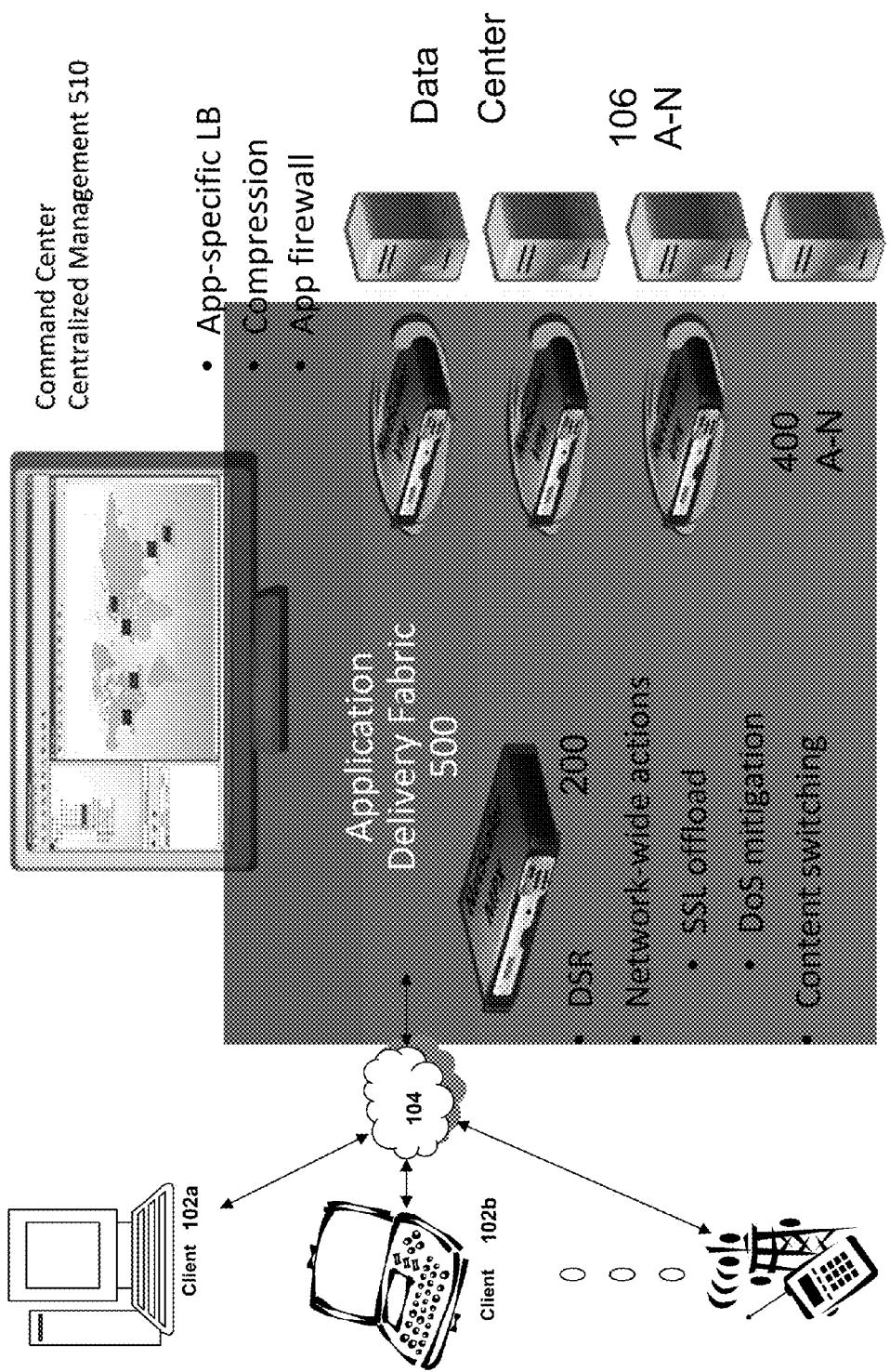
FIG. 5A is a block diagram of an embodiment of a application delivery fabric.

Referring now to FIG. 5A, an embodiment of an environment providing an application delivery fabric (ADF) 500 is shown and described. In brief overview, a plurality of clients 102 access resources from one or more servers 106 in a data center via a combination of one or more appliances 200 and one or more virtual appliances 400A-400N deployed on any one or more servers 106A-106N. In this embodiment, a centralized management and command center 510 provides a configuration, administration and management tool for configuring, monitoring and administering the appliances 200 and any virtual appliances 400A-400N. One or more appliance 200 may provide network-wide actions in the form of SSL offloading, Denial of Service (Dos) mitigation and/or content switching. Further, the one or more appliances 200 may provide dynamic source routing (DSR) for a mesh or adhoc network of one or more virtual appliances 400A-400N. The virtual appliance 400A-N may be deployed statically or dynamically on one or more servers 106. These virtual appliances 400 may be dynamically deployed and undeployed in an adhoc manner as desired, on demand, automatic or manually. The virtual appliances 400 may each perform one or more application delivery and performance functionality such as application specific load balancing, compression and/or application firewalling.

The application delivery fabric (ADF) 500 comprises any number of infrastructure components, systems, applications or services deployed in a network, such as a mesh or adhoc network, for delivering applications to users. In some cases, an ADF 500 refers to systems and processes for delivering applications that make use of multiple, integrated products deployed in a mesh or ad-hoc network. The ADF 500 may secure, optimize, accelerate, and reliably deliver applications, information and resources, including front-end, midtier, support, and back-end systems. In some cases, an ADF 500 refers to the distributed infrastructure components deployed along the line-of-sight between data centers and users to ensure the successful, reliable delivery of any application to any user in any location.

As illustrated in FIG. 5A, the ADF 500 may comprise one or more appliances 200 and one or more virtual appliances 400A-N for delivering applications from servers 106 in a data center to one or more clients 102. In some embodiments, the ADF 500 includes other systems such as the application delivery system 190 of FIG. 1D and/or the WAN optimization device 205 of FIG. 1C. In some embodiments, the ADF 500 includes a portion of a cloud computing service 575 in which servers 106, systems and virtual appliances 400 are available and deployed for use, dynamically or otherwise (as described in reference to FIG. 5B). Each of the appliances, systems and virtual appliances 400 may be identified as a node in an adhoc or mesh network of the ADF 500. As appliances, systems and virtual appliances 400 are deployed and/or undeployed, the adhoc or mesh network changes and thus, the ADF 500 changes accordingly.

The appliances 200 and/or virtual appliances 400 may communicate information via any type and form of connection and/or protocol to provide information regarding the topology, status, location, operation and performance of any node in the ADF 500. As deployment of nodes of appliances 200, virtual appliances 400 or systems change (e.g., nodes are added or removed from the ADF 500), the nodes may provide updates to the information regarding their topology, status, location, operation and performance. In some embodiments, one or more appliances 200 and/or virtual appliances 400 may be configured as or act as a master node for maintaining or receiving such information. In some embodiments, one or more appliances 200, such as a master node, may provide dynamic routing, such as dynamic source routing, to nodes in the ADF 500.

The ADF 500 may comprise any combination of heterogeneous or homogenous systems, appliances 200 and virtual appliances 400. In some embodiments, the ADF 500 may be dedicated to a company or group of users. In other embodiments, the ADF 500 may support multi-tenancy by supporting and being used for multiple companies or multiples groups of users. In some embodiments, the ADF 500 may comprise multiple appliances 200 of the same type and/or configuration. In other embodiments, the ADF 500 may comprise multiple appliances 200 of different types and/or different configurations. In some embodiments, one or more of the deployed virtual appliances 400 may be of the same type and/or configuration. In other embodiments, one or more of the deployed virtual appliances 400 may be of different types and/or different configurations. In some embodiments, a virtual appliance 400 may be deployed and/or configured for load balancing. In some embodiments, a virtual appliance 400 may be deployed and/or configured for acceleration, such as compression and/or caching. In various embodiments, a virtual appliance 400 may be deployed and/or configured for security, such as application firewall. In further embodiments, a virtual appliance 400 may be deployed and/or configured for offloading by performing connection pooling and multiplexing. In some embodiments, the virtual appliance 400 may be configured for any combination of load balancing, acceleration, security and/or offloading.

The ADF 500 may use any services and resources of or from a cloud computing service or environment 575. An IT infrastructure may extend from a first network—such as a network owned and managed by an enterprise—into a second network, which may be owned or managed by a separate entity than the entity owning or managing the first network. Resources provided by the second network may be said to be "in a cloud". Cloud-resident elements may include, without limitation, storage devices, servers 106, databases, computing environments (including virtual machines 306 and desktops), and applications. In various embodiments, one or more networks providing computing infrastructure on behalf of customers may be referred to a cloud. In one of these embodiments, a system in which users of a first network access at least a second network including a pool of abstracted, scalable, and managed computing resources capable of hosting user resources may be referred to as a cloud computing environment. In another of these embodiments, resources may include, without limitation, virtualization technology, data center resources, applications, and management tools. In some embodiments, Internet-based applications (which may be provided via a "software-as-a-service" or "platform-as a service" model) may be referred to as cloud-based resources. In other embodiments, networks that provide users with computing resources, such as virtual machines 306 or blades on blade servers, may be referred to as compute clouds. In still other embodiments, networks that provide storage resources, such as storage area networks, may be referred to as storage clouds. In further embodiments, a resource may be cached in a local network and stored in a cloud.

An ADF 500 and components of the ADF 500 may be configured, arranged, implemented or deployed in any manner for any logical grouping of support to one or more companies, one or more users or groups of users, or one or more appliances, services or resources. In some embodiments, the ADF 500 may be dedicated to a company or group of users. In other embodiments, the ADF 500 may support and be used for multiple companies or multiples groups of users. In some embodiments, a first group of one or more appliances 200 and/or virtual appliances 400 may be for a first data center. In some embodiments, a second group of one or more appliances 200 and/or virtual appliances 400 may be for a second data center. In some embodiments, a first group of one or more appliances 200 and/or virtual appliances 400 may be for a first application or service. In some embodiments, a second group of one or more appliances 200 and/or virtual appliances 400 may be for a second application or service. In some embodiments, a first group of one or more appliances 200 and/or virtual appliances 400 may be for a first company. In some embodiments, a second group of one or more appliances 200 and/or virtual appliances 400 may be for a second company. In some embodiments, a first group of one or more appliances 200 and/or virtual appliances 400 may be for a first group of users. In some embodiments, a second group of one or more appliances 200 and/or virtual appliances 400 may be for a second group of users.

The command center 510 may comprise any type and form of user interface for administering, configuring, maintaining, controlling and/or monitoring of the ADF 500 and/or any components thereof. The command center 510 may provide an interface for a user to identify, add, remove or modify any element of the topology, configuration, location and network information for any of the nodes in the adhoc or mesh network of the ADF 500. The command center 510 may provide a user interface to identify under what conditions or by what policies any of the virtual appliances 400 may be deployed and what functionality of these virtual appliances 400 are to be deployed. The command center 510 may provide a user an interface to deploy or undeploy a virtual appliance 400. The command center 510 may provide a user interface to monitor the performance and operational characteristics of the ADF 500 and/or any components thereof.

Figure 5B:
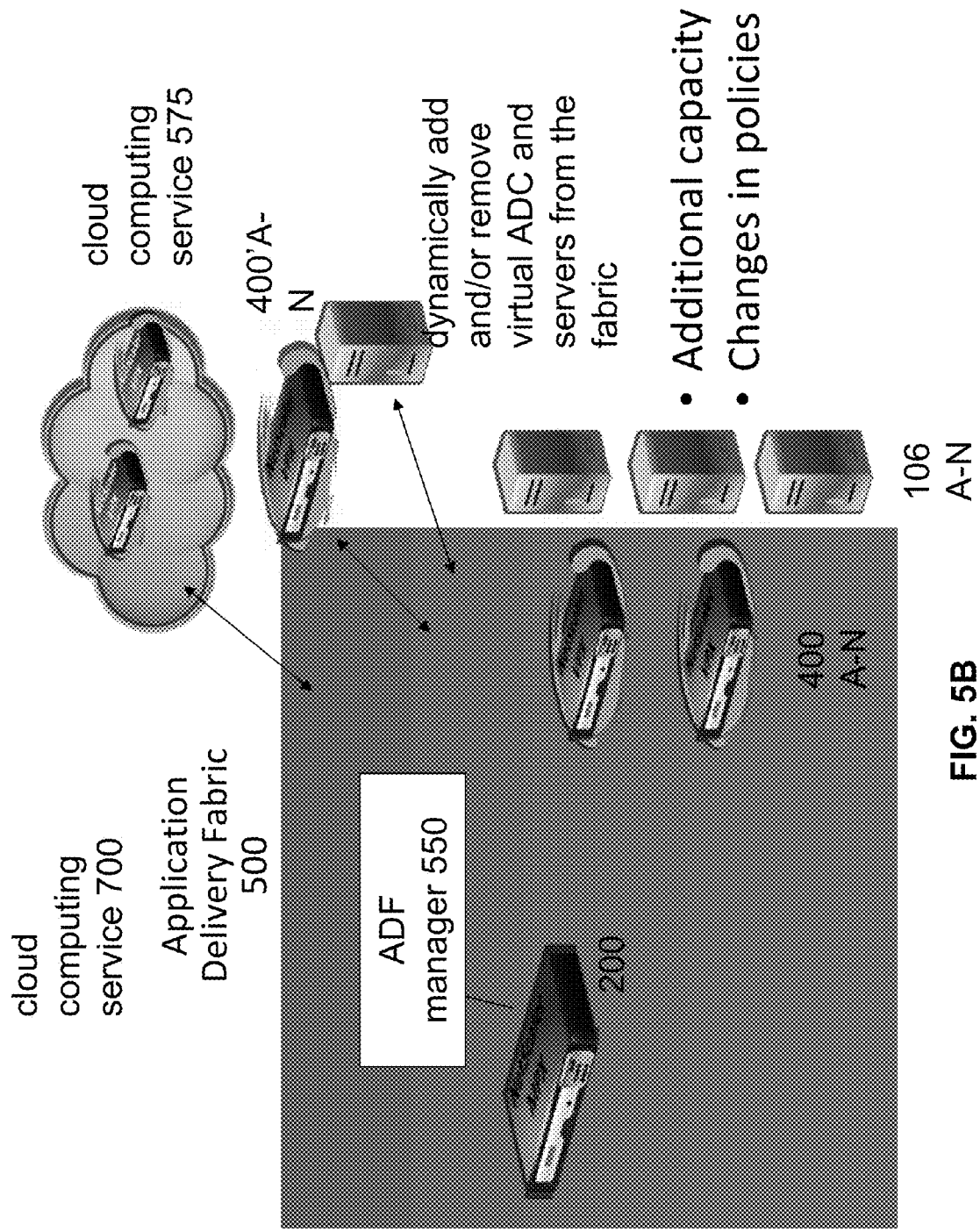
FIG. 5B is a block diagram of another embodiment of a application delivery fabric.

Referring now to FIG. 5B, another embodiment of the ADF 500 is depicted. In brief overview, an ADF manager 550 may provide management of the deployment and/or undeployment of any component of the ADF 500, such as a virtual appliance 400. Depending on the configuration, logic or policies of the ADF manager 550, one or more virtual appliances 400 may be dynamically added or removed from the ADF 500. For example, the ADF manager 550 may cause one or more virtual appliances 400 to be deployed in the ADF 500 to address additional capacity needs. In another example, an administrator may change policies that cause one or more virtual appliances 400 to be undeployed or deployed.

The ADF manager 550 may comprise any combination of hardware and/or software to provide operations, functions, logic or business rules to manage and/or control the ADF 500 or any components thereof. The ADF manager 550 may comprise any application, program, service, library, task, script or set of executable instructions executing on a device. The ADF manager 550 may perform any of the operations described herein. The ADF manager 550 may operate, run or execute on any device within or outside the nodes of the ADF. In some embodiments, the ADF manager 550 runs on one of the appliances 200. In another embodiment, the ADF 500 may operate on a stand-alone device, such as an ADF appliance or service. The ADF manager 550 may communicate with, interface to or be a part of the command center 510. In such embodiments, the ADF manager 550 may execute any administration, configuration or policies changes to reflect such changes in the ADF 500. The ADF manager 550 may also monitor the performance and/or operational characteristics of the ADF 500 and components thereof and provide such information to the command center 510.

The ADF manager 550 may be designed and constructed to deploy or undeploy a virtual appliance 400 in the ADF. The ADF manager 550 may determine when and how to deploy or undeploy a virtual appliance 400 based on any command, configuration, rule or policy. The ADF manager 550 may dynamically deploy or undeploy a virtual appliance 400 responsive to any command, configuration, rule or policy. The ADF manager 550 may dynamically deploy or undeploy a virtual appliance 400 responsive to monitoring, detecting or identifying any operational and/or performance characteristics of the nodes of the ADF 500.

The ADF manager 550, such as configured on appliance 200, may dynamically change the topology of virtual appliances 400 responsive to any one or combination of a number of users, a number of connections, a number of requests, use of bandwidth, transmission rates, round trip times, response times, health of a service or virtual server and/or any statistical measurement of any of above. In response to any changes of these performance and/or operational characteristics exceeding, meeting or falling under or within a predetermined threshold or range, the ADF manager 550 may dynamically deploy or undeploy a virtual appliance 400. One or more policies may be specified or configured to set the threshold and identify the action to perform with respect to a virtual appliance 400. The ADF manager 550 may deploy or undeploy a virtual appliance 400 responsive to a policy. In some embodiments, the policy may identify the type, location and configuration of the virtual appliance 400. The policy may identify the type, form and/or location of a virtualized environment 300 to run the virtual appliance 400. The policy may identify the type, form and/or location of a server 106, processor or core of a processor to run the virtual appliance 400. The policy may identify when to undeploy a virtual appliance 400.

The ADF manager 550 may communicate, interface or integrate with one or more cloud computing services 575 to deploy and/or undeploy one or more virtual appliances 400 on one or more servers 106 provided by the cloud computing services 575. For example. the ADF manager 550 may request a cloud computing service 575 to deploy a virtual appliance 400. The ADF manager 550 may provide the software of the virtual appliance 400 to the cloud computing service 575 to dynamically deploy on resources managed and provided by the cloud computing service 575.

Figure 6:
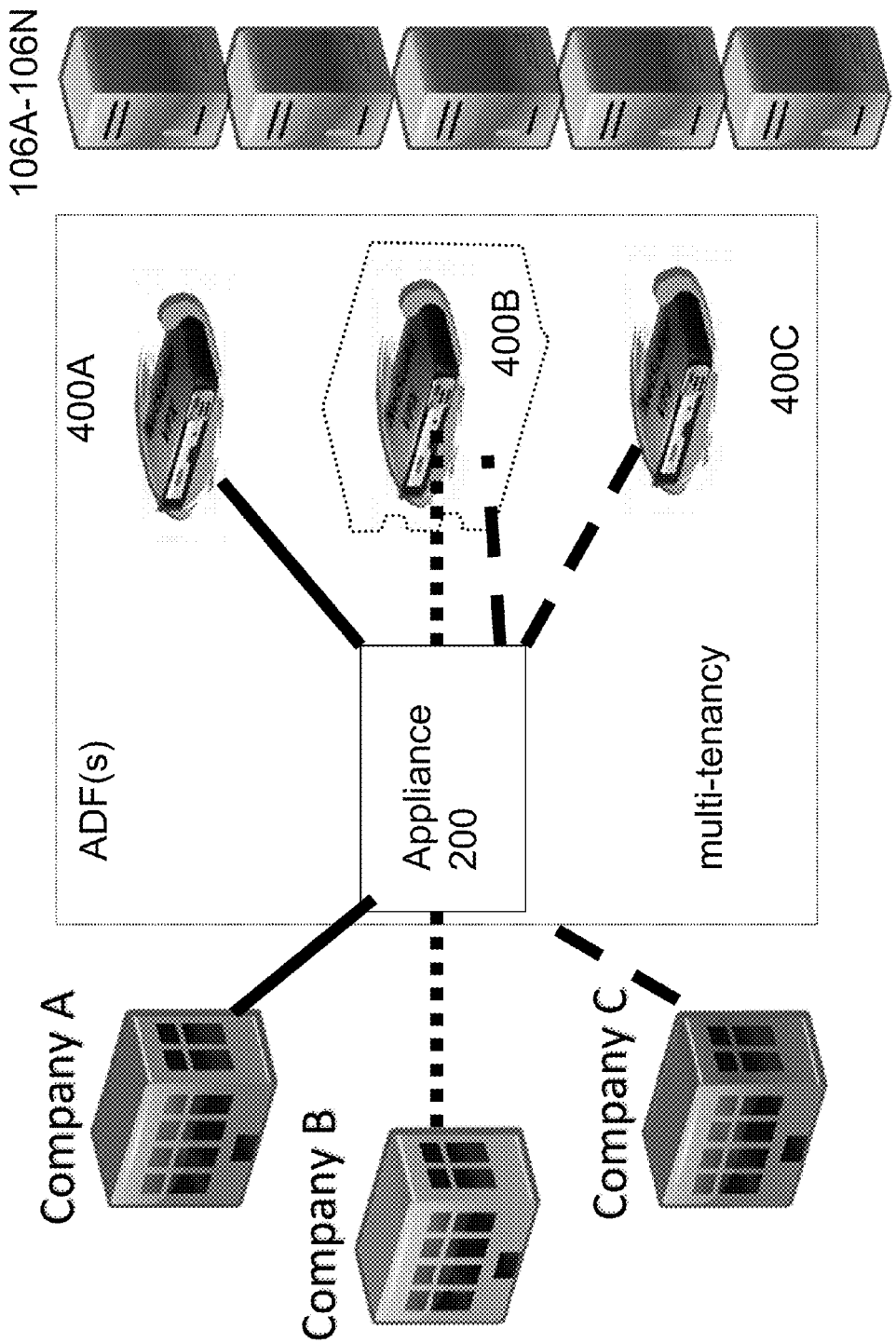
FIG. 6 is a block diagram of an embodiment of a multi-tenant environment.

Referring now to FIG. 6, an embodiment of an ADF 500 providing multi-tenancy for a plurality of companies is depicted. In brief overview, one or more ADFs 500 may be used to support and deliver applications, computing environments and/or resources to multiple companies and their users, such as company A, company B and company C. One or more appliances 200 may be deployed in the to service each of these companies. For example, one appliance 200 may receive network traffic from computing devices of these companies and determine which virtual appliances 400 will service the traffic. One or more virtual appliances 400 may be deployed in conjunction with the appliance 200 to provide services to each of the companies. For example, virtual appliance 400A may be dedicated to company A, virtual appliance 400C to company C, and virtual appliance 400B to both Company A and Company C.

With the use of virtualized environments 300, a single server 106 may host a plurality of virtual appliances 400 via a plurality of virtual machines 306. As each virtualized environment 300 may provide a distinct separation of resource use of the server 106 via a virtual machine 306, each of the virtual appliances 400 may be dedicated to a different company, users, service or application without conflict to any another virtual appliance 400 in a different virtualized environment 300. In this manner, one or more virtual appliances 400 may be deployed on a device that has multiple tenants. For example, virtual appliance 400B and/or server 106 may comprise a first virtual appliance 400A on a first virtual machine 306A for a first company and a second virtual appliance 400B on a second virtual machine 306B for a second company. These virtual machines 306 may either be in the same virtualized environment 300 or different virtualized environments 300.

With the flexibility of deploying virtual appliances 400 on virtual machines 306 hosted on one or more servers 106, the ADF 500 may support multiple tenants, such as multiple companies. Furthermore, an ADF manager 550 may dynamically change the topology of the ADF 500 responsive to performance and/or operational characteristics of the portion of the ADF 500 corresponding to a specific tenant. For example, responsive to capacity or policy changes, the ADF manager 550 may deploy or undeploy a virtual appliance 400 for a company while leaving unchanged virtual appliances 400 for another company. In other embodiments, one or more ADF managers 550 may manage multiple ADFs 500 that overlay the same or common infrastructure components, such as the same appliances 200 and virtual appliances 400 being used for multiple tenants. For example, appliance 200 and virtual appliance 400A may be part of a first ADF for company A. Appliance 200 and virtual appliance 400B may be part of a second ADF for company B, and appliance 200 and virtual appliances 400B and 400C may be part of a third ADF for company C.

Figure 7:
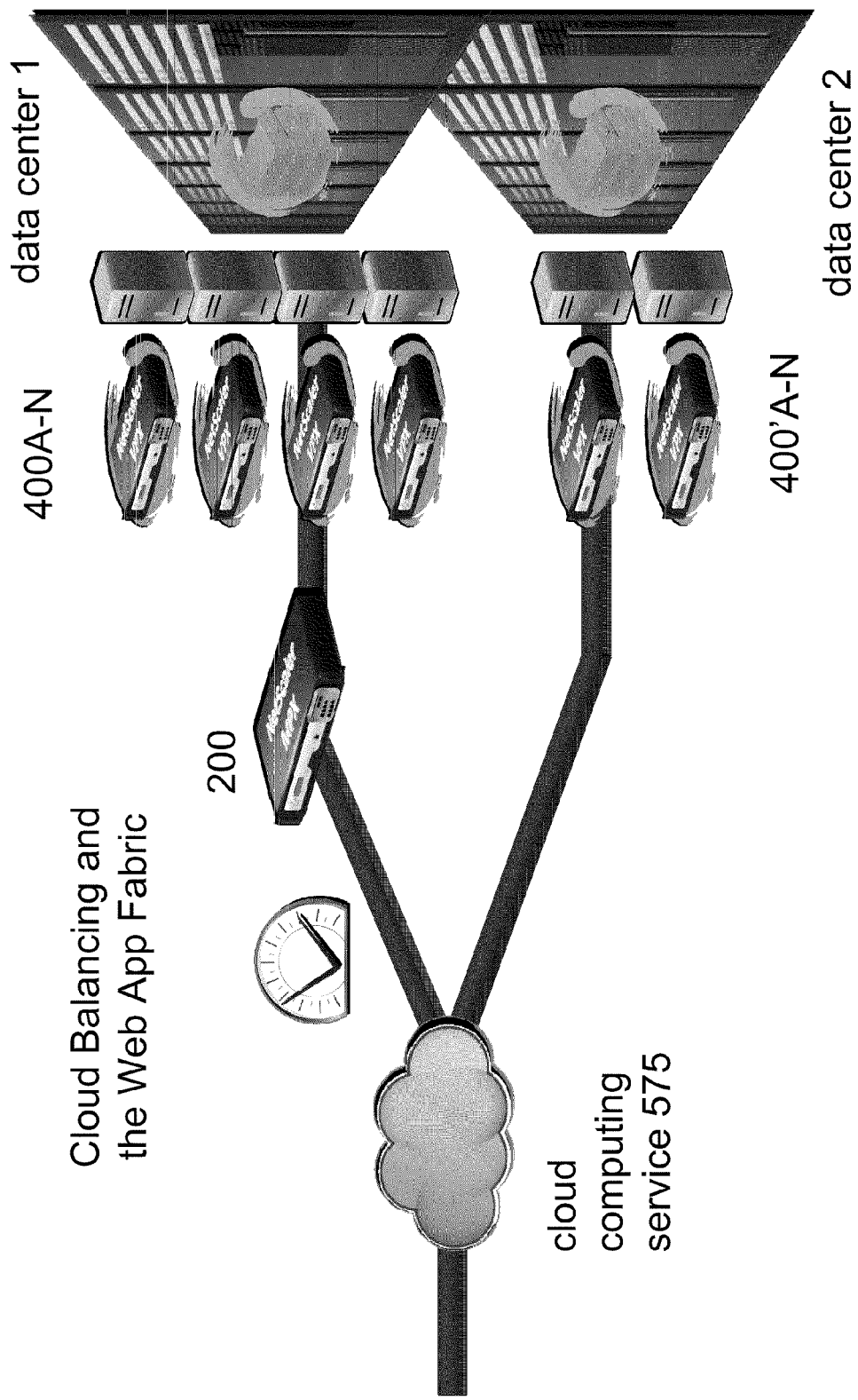
FIG. 7 is a block diagram of an embodiment of a cloud balancing.

Referring now to FIG. 7, another embodiment of an ADF 500 delivered via a cloud computing service 575 is depicted. In brief overview, a cloud computing service provider 575 may deploy an ADF 500 and any appliances and/or virtual appliances of the ADF 500 to address changes in operation and performance, such as capacity, level of service and demand. For example, the cloud computing service 575 may be using an appliance 200 and virtual servers 400A-400N at a first data center for servicing one tenant or user. Based on changes in operations, the cloud computing service 575 may deploy one or more virtual appliances 400 at a second data center to handle these changes. For example, the load on the first data center may reach a threshold and the cloud computing service 575 may deploy virtual appliances 400 at the second data center to handle the additional load. In this manner, the cloud computing service 575 may leverage the flexible, extensible and dynamic nature of the ADF 500 to more effectively and manage its operations in servicing and providing a level of service to users of their cloud computing service 575.

With the systems and methods of the ADF 500, the virtual appliances 400, and the virtual appliances 400 operating on virtual machines 306 and/or multiple cores and processor, these systems provide a dynamic, flexible and extensible solution for scaling, balancing and using resources more efficiently and effectively for delivering applications and resources to a wide range of users and technology environments. With the ADF 500 described herein, application delivery controllers can be deployed on-demand and to any location and when and where most needed. Enterprises and administrators can leverage the ADF 500 to provide more efficient use of resources, including dynamic allocations/re-allocation of resources, and flexible re-purposing of resources that leverage dynamic data center processes.

It should be understood that the systems described above may provide multiple components of any of the components described herein and these components may be provided on either a standalone machine or, in some embodiments, on multiple machines in a distributed system. In addition, the systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Figure 8:
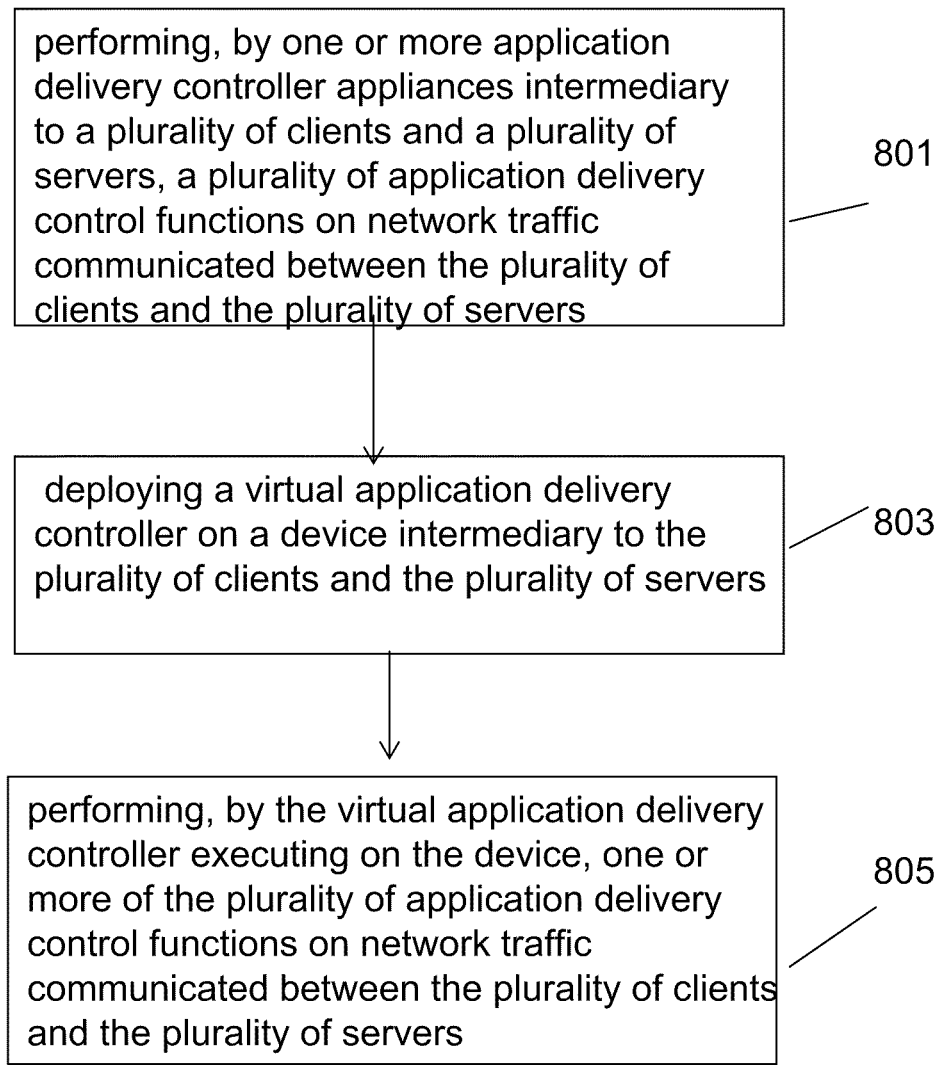
FIG. 8 is a flow diagram depicting an embodiment of a method of deploying a virtual application delivery controller.

Referring now to FIG. 8, an embodiment of a method for deploying a virtual application delivery controller 400 is shown and described. The method includes performing, by one or more application delivery controller appliances intermediary to a plurality of clients and a plurality of servers, a plurality of application delivery control functions on network traffic communicated between the plurality of clients and the plurality of servers (step 801). The method also includes deploying a virtual application delivery controller on a device intermediary to the plurality of clients and the plurality of servers (step 803). The method also includes performing, by the virtual application delivery controller executing on the device, one or more of the plurality of application delivery control functions on network traffic communicated between the plurality of clients and the plurality of servers (step 805).

One or more application delivery controller appliances intermediary to a plurality of clients and a plurality of servers performs a plurality of application delivery control functions on network traffic communicated between the plurality of clients and the plurality of servers (step 801). The one or more appliances 200 may perform application delivery control functions on network traffic received from clients. In some embodiments, the appliances 200 may perform these functions on network traffic routed from a master node. The appliances 200 may perform functionality for availability, performance, offloading, and/or security, according to any of the methods described in reference to FIGS. 4A-5A. The appliances 200 may also perform dynamic service routing on the network traffic to redirect the traffic to servers 106 with resources of interest to the users of the clients.

In many embodiments, the appliances 200 communicate information about the their operation and/or performance. The appliances 200 transmit this information to any component, such as a master node, that aggregates information about the operation and performance of nodes in an ADF 500. In some embodiments, the component may be an ADF manager 550 or a command center 515, such as the managers 550 and command centers 515 described in reference to FIGS. 5A and 5B. The appliances 200 may receive information about the operation and/or performance of other appliances 200 and transmit the information to the ADF manager 550 or command center 515. With respect to this method, any operation described herein as performed by an ADF manager 550 may be performed by a command center 515, and vice versa.

In some embodiments, a virtual application delivery controller (ADC) is deployed on a device, such as a device intermediary to a plurality of clients and the plurality of servers (step 803). The virtual ADC may be deployed with or operate in conjunction with the one or more application delivery controller appliances. In some embodiments, multiple virtual ADCs are deployed on the same device. In some embodiments, multiple virtual ADCs are deployed on a plurality of devices. In some embodiments, a virtual ADC is deployed on an appliance. In some embodiments, a virtual ADC is deployed on a core of a multi-core appliance. In some embodiments, a virtual ADC is deployed on a server. In some embodiments, a virtual ADC is deployed on a server in a server farm. In some embodiments, a virtual ADC is deployed on a server from a cloud computing service or network.

An ADF manager 550 or centralized command center 515 may determine to deploy the virtual application delivery controller 400. In many embodiments, an ADF manager 550 or command center 515 uses a policy to decide when to deploy a virtual appliance 400 on a device. The ADF manager 550 or command center 515 may include default policies to guide such deployment. In some embodiments, a user, such as an ADF administrator, may customize the policies. For example, a user may specify to a command center 515 the conditions under which virtual appliances 400 shall be deployed. The command center 515 may monitor the nodes in the ADF 500 deploy virtual appliances 400 when one or more of the conditions are fulfilled. In alternative embodiments, the command center 515 may transfer these conditions to an ADF manager 550 that monitors the nodes in the application delivery fabric 500. When the ADF manager 550 detects that the conditions have been fulfilled, the ADF manager 550 may deploy a virtual appliance 400. In any of these embodiments, the policy or conditions may relate to the operation and/or performance of the nodes in the ADF 500.

The ADF manager 550 may select a device to host the virtual appliance 400. For example, the ADF manager 550 may select the device from a predetermined group of devices, such as a server farm at a data center. The ADF manager 550 may store the identities of devices reserved for hosting virtual appliances 400 or consult an external database for the identities of such devices. In some embodiments, the ADF manager 550 may request a cloud service 575 to execute the virtual application delivery controller 400 on resources provided by the cloud service 575. The cloud service 575 may allocate a device to host the virtual appliance 400 and transmit the identity of the device to the ADF manager 550.

The virtual appliance 400 may be deployed via software modules installed on the selected device. The software modules may be stored in any location, such as the ADF manager 550, command center 515, software database, or an appliance 200. In various embodiments, one or more of the plurality of application delivery control functions for the virtual appliance 400 may be configured for deployment. For example, a virtual appliance 400 may be configured for load balancing, acceleration, security, offloading, or any combination thereof.

In some embodiments, when the ADF manager 550 determines a virtual appliance 400 should be deployed, the ADF manager 550 may transmit a copy of software modules to the selected device for deployment thereon. In another example, the ADF manager 550 may transmit an instruction to the selected device to deploy a virtual appliance 400, and the selected device may request the software modules for the virtual appliance 400 from a software database. In further examples, the ADF manager 550 may transmit an instruction to the appliance 200 closest to the selected device to transmit a copy of the software modules to the device. In yet another example, the ADF manager 550 may transmit the software modules to the cloud service 575, and the cloud service 575 deploys the modules on the device allocated for the virtual appliance 400.

The software modules of the virtual appliance 400 may be installed to execute in a non-virtualized environment of the device. In some of these embodiments, the software modules may execute on the operating system of the device. In other examples, the software modules are deployed in a virtualized environment 300 provided by the device. In one such example, the software modules may execute on a virtual operating system hosted by the device. In further examples, the virtual appliance 400 may be deployed to execute on a virtual machine 306 provided by the device or deployed to execute as a virtual machine 306 on the device. In some embodiments, the software modules may include any of the virtual machines or virtualized environment for the virtual ADC.

Deploying a virtual appliance 400 may change the topology of the ADF 500. After a virtual appliance 400 is deployed on a device, the virtual appliance 400 begins communicating information about its topology, status, location, operation, and/or performance. A virtual appliance 400 may transmit such information to an ADF manager 550, a command center, a master node, or any component that monitors the nodes of the ADF 500.

After the virtual application delivery controller is deployed on a device intermediary to the plurality of clients and the plurality of servers (step 803), the virtual application delivery controller executing on the device performs one or more of the plurality of application delivery control functions on network traffic communicated between the plurality of clients and the plurality of servers (step 805).

The virtual appliance 400 may perform the one or more of the plurality of application delivery control functions on a first portion of network traffic concurrently to the one or more application delivery controller appliances 200 performing the plurality of application delivery control functions on a second portion of network traffic. In these embodiment, the virtual appliance 400 operates like an appliance 200 functioning in parallel with other application delivery controller appliances 200 in the ADF 500, servicing a portion of the network traffic the ADF 500 receives from clients. Thus, the virtual appliance 400 may be configured to perform the same application delivery control functions as the appliances 200. The virtual appliance 400 may perform any of these functions before transmitting the network traffic to a server 106 that services the network traffic.

The virtual appliance 400 may perform a first application delivery control function on a first portion of network traffic subsequent to an application delivery controller appliance 200 performing a second application delivery control function on the first portion of network traffic. In these embodiments, the appliance 200 first performs at least one application delivery control function on the network traffic. For example, the appliance 200 may perform network-wide actions such as of SSL offloading, Denial of Service (Dos) mitigation and/or content switching. Then, the appliance 200 routes the network traffic to the virtual appliance 400 via, for example, DSR. The virtual appliance 400 performs at least one other application delivery control function on the network traffic, such as application specific load balancing, compression, and/or application firewalling. In these embodiments, the virtual appliance 400 may perform application delivery control functions distinct from the functions of the appliance 200. In particular, the virtual appliance 400 may perform one or more application delivery control functions that are performed subsequently to the application delivery control functions performed by the appliances 200.

In embodiments where the application delivery fabric is composed solely of virtual appliances, a virtual appliance 400a may perform a first application delivery control function on a first portion of network traffic subsequent to another virtual appliance 400b performing a second application delivery control function on the first portion of network traffic. In these embodiments, a virtual appliance 400 may be configured to perform functions delegated to application delivery controllers. For example, a virtual appliance 400b may perform network-wide actions such as of SSL offloading, Denial of Service (Dos) mitigation and/or content switching. Then, the virtual appliance 400b may route the network traffic to another virtual appliance 400a that performs additional functions, such as application specific load balancing, compression, and/or application firewalling.

Figure 9:
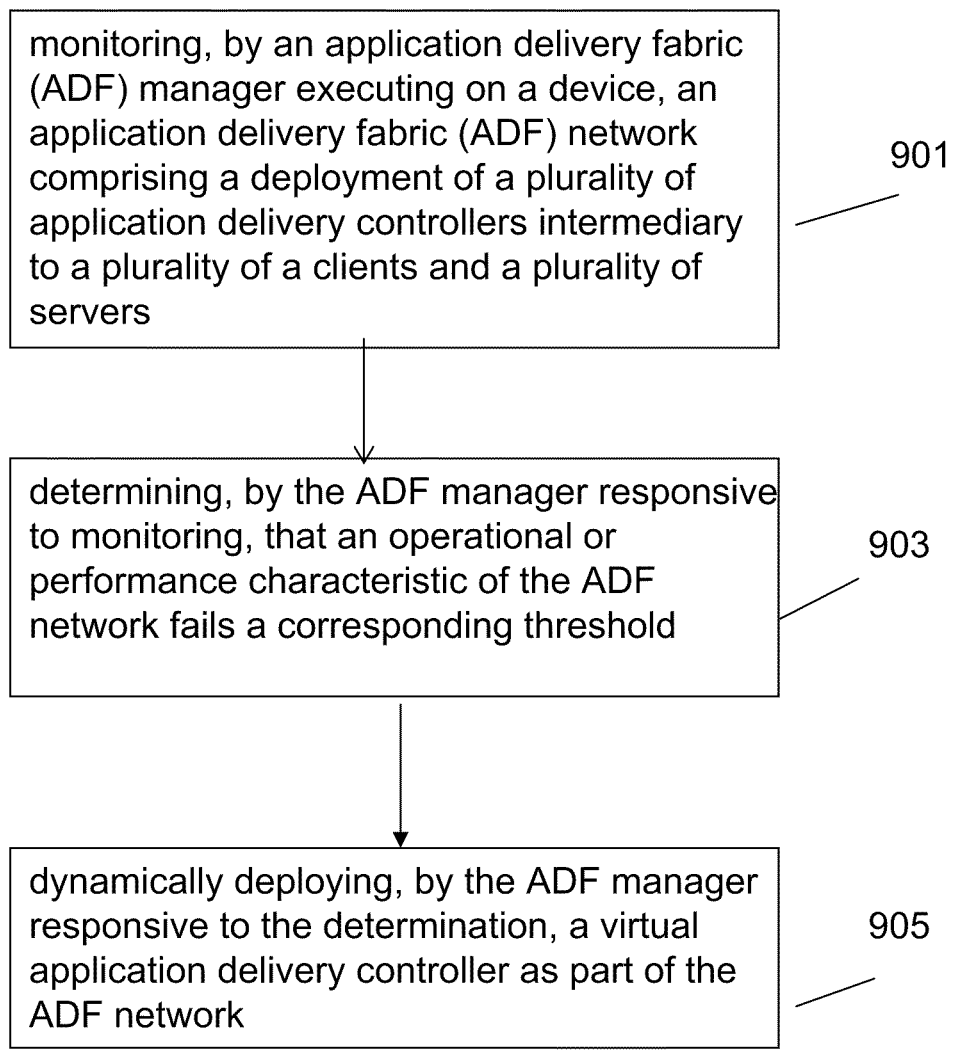
FIG. 9 is a flow diagram depicting an embodiment of managing a plurality of application delivery controllers of an application delivery network.

Referring now to FIG. 9, an example embodiment of a method for managing a plurality of application delivery controllers of an application delivery network is shown and described. The method includes monitoring, by an application delivery fabric (ADF) manager executing on a device, an application delivery fabric (ADF) network comprising a deployment of a plurality of application delivery controllers intermediary to a plurality of a clients and a plurality of servers (step 901). The method also includes determining, by the ADF manager responsive to monitoring, that an operational or performance characteristic of the ADF network fails a corresponding threshold (step 903). The method also includes dynamically deploying, by the ADF manager responsive to the determination, a virtual application delivery controller as part of the ADF network (step 905).

In operation, an application delivery fabric (ADF) manager executing on a device monitors an application delivery fabric (ADF) network comprising a deployment of a plurality of application delivery controllers intermediary to a plurality of a clients and a plurality of servers (step 901). The ADF manager 550 may execute on any device as described in reference to FIGS. 5A and 5B. Further, the ADF manager 550 may monitor the ADF network 500 according to any method described in reference to FIGS. 5A and 5B. In particular, the ADF manager 550 may be configured to receive information from each node in the ADF network 500 about the node's topology, status, location, operation, and/or performance. As such, when each node is deployed in the ADF network 500, the node may be configured to transmit such information to the ADF manager 550. In various embodiments, a node may transmit information such as its number of users, number of active connections, response times, bandwidth rates, and/or transmission rates.

In some embodiments, a node may transmit the information at predetermined intervals of time. In additional embodiments, a node may transmit the information in response to significant events. For example, when a node detects that its performance has fallen beneath a threshold, the node may transmit a signal to the ADF manager 550 indicating this event. In another example, when a node detects that its load has increased by a predetermined percentage or reached a predetermined capacity, the node may indicate this event to the ADF manager 550.

Further, the ADF manager 550 may transmit probes to a node to obtain any type of information at any time. If the ADF manager 550 has not received information from a node after a predetermined interval of time has lapsed, the manager 550 may transmit a probe inquiring about the status of the node. If the probe times out without a response, the ADF manager 550 may conclude that the node is non-operational and/or nonfunctional. If the ADF manager 550 receives information that multiple nodes have low bandwidth rates, the ADF manager 550 may probe the nodes for information about their active connections with a view towards consolidating the connections on one node.

The ADF network 500 may refer to any of the embodiments described in reference to FIG. 5A. The ADF manager 550 may establish one or more application delivery controller appliances 200 and/or one or more virtual application delivery controllers 400 as part of the ADF network 500. In some embodiments, the ADF network 500 may include nodes corresponding to one or more virtual appliances 400 intermediary to a plurality of clients 102 and a plurality of servers 106. These virtual appliances 400 may provide the same functionality as the appliances 200. In various embodiments, the virtual appliances 400 may be intermediary to the plurality of appliances 200 and the plurality of servers 106. The appliances 200 perform at least one application delivery control function on network traffic and route the network traffic to the virtual appliances 400. The virtual appliances 400 perform additional application delivery control functions on the network traffic before routing the network traffic to the servers 106. In further embodiments, the ADF network 500 may include a portion of at least one cloud computing service 575. The cloud computing services 575 includes resources, such as servers 106 or other computing devices, that may be dynamically deployed for the ADF network's 500 use.

Responsive to the application delivery fabric (ADF) manager monitoring an application delivery fabric (ADF) network, the ADF manager may determine that an operational or performance characteristic of the ADF network fails a corresponding threshold (step 903). The ADF manager 550 may aggregate the information received from the nodes to calculate an operational or performance characteristic of the ADF network 500. In some embodiments, the ADF manager 550 aggregates the information only from appliances 200. In other embodiments, the ADF manager 550 aggregates information from both appliances 200 and virtual appliances 400.

In various embodiments, the operational or performance characteristic may correspond to a number of users using the ADF network 500 or a number of connections an ADF network 500 is servicing. The operational or performance characteristic may correspond to the response times of servers 106 via the appliances 200 and/or virtual appliances 400 in the ADF network 500. The operational or performance characteristics may correspond to bandwidth and/or transmission rates via the appliances 200 and/or virtual appliances 400. The ADF manager 550 may store thresholds corresponding to any of these operational or performance characteristics.

When the ADF manager 550 aggregates received information from the nodes to calculate an operational or performance characteristic of the ADF network 500, the ADF manager 550 may compare the characteristic to the corresponding threshold. If the characteristic exceeds the corresponding threshold, the ADF manager 550 may determine that the characteristic of the ADF network 500 fails the threshold.

Responsive to the ADF manager 550 determines that an operational or performance characteristic of the ADF network fails a corresponding threshold (step 903), the ADF manager 550 may dynamically deploy or undeploy a virtual application delivery controller as part of the ADF network (step 905).

The ADF manager 550 may deploy the virtual appliance 400 according to a policy when the ADF network 500 fails a threshold. The ADF manager 550 may select a device to deploy the virtual appliance 400 according to any method described in reference to FIG. 8. In some embodiments, the ADF manager 550 may dynamically deploy the virtual appliance 400 via a cloud service. The ADF manager 550 may provide a request to deploy a virtual appliance 400 to a cloud service. In some embodiments, the request includes the software modules for deploying the virtual appliance 400. In response, the cloud service allocates a server 106 from its resources, installs the software modules therein, and transmits the identity of the server 106 to the ADF manager 550. The ADF manager 550 may add the cloud service's server 106 to the ADF network 500 and begin receiving information from this server 106.

In some embodiments, in response to the ADF manager's 550 request to deploy a virtual appliance 400, the cloud service 575 allocates a server 106 and transmits the identity of the server 106 to the ADF manager 550. Then, the ADF manager 550 transmits the software modules for deploying the virtual appliance 400 to the cloud service 575, and the cloud service 575 installs the modules on the server 106. In some embodiments, the ADF manager 550 communicates directly with the allocated server 106 to deploy the virtual appliance 400 thereon. The ADF manager 550 adds the server 106 to the ADF network 500 and begins receiving information from the server 106.

After the ADF manager 550 dynamically deploys a virtual application delivery controller 400 as part of the ADF network 500, the ADF manager 550 may undeploy a virtual application delivery controller 400 from the ADF network 500, such as responsive to monitoring or administration. As the ADF manager 550 continues to receive information from the nodes in the ADF network 500, the ADF manager 550 may update operational or performance characteristics of the ADF network 500. Based on these characteristics, the ADF manager 550 may determine that network contraction is appropriate and undeploy a virtual appliance 400.

In many embodiments, to make this determination, the ADF manager 550 compares the operational or performance characteristics of the ADF network 500 with the operational or performance capacities of the network 500. As the ADF manager 550 deploys more appliances 200 or virtual appliances 400, the ADF manager 550 adds the operational or performance capacities of the newly deployed components to the net capacities of the pre-existing ADF network 500. For example, if the ADF manager 550 deploys a virtual appliance 400 capable of serving 4000 users, the ADF 500 increases the number of users the ADF network 500 may service by 4000. In this manner, the ADF manager 550 may track the capacity of the deployed network 500.

The ADF manager 550 may undeploy at least one virtual appliance 400 if the operational or performance characteristics of the ADF network 500 are less than a predetermined percentage of the network capacity. For example, if the ADF manager 550 determines the ADF network 500 is operating at 75% of its capacity according to any of the metrics described herein, the ADF manager 550 may undeploy at least one virtual appliance 400. In some embodiments, the ADF manager 550 may undeploy at least one virtual appliance 400 if the operational or performance characteristics of the ADF network 500 warrant consolidation of network traffic among fewer appliances and virtual appliances. For example, if removal of a virtual appliance 400 and consolidation of the network traffic among the remaining appliances permits the ADF network 500 to function within a predetermined range of capacities, the ADF manager 550 may undeploy at least one virtual appliance 400. The ADF manager 550 may select any virtual appliance 400 to undeploy. In some embodiments, the ADF manager 550 may select a virtual appliance 400 operating at the lowest capacity. The virtual appliance's 400 network traffic is rerouting to neighboring virtual appliances 400 before undeployment. In many embodiments, the ADF manager 550 may select a virtual appliance 400 with the smallest capacity. The ADF manager 550 may continue to undeploy virtual appliances 400 in order of increasing capacity until the ADF network 500 reaches a desired overall capacity. In this manner, by undeploying virtual appliances 400 with small capacities first, the ADF manager 550 minimizes the number of virtual appliances in the ADF network 500.

Although the systems and methods herein may describe an application delivery fabric of application delivery controller appliances and virtual application delivery controllers, in various embodiments, the fabric may include solely a plurality of embodiments of virtual application delivery controllers, as would be appreciated by one of ordinary skill in the art.

In view of the structure, functions and apparatus of the systems and methods described here, the present solution provides efficient and intelligent system for deploying virtual appliances. Having described certain embodiments of methods and systems for deploying virtual appliances, it will now become apparent to one of skill in the art that other embodiments incorporating the concepts of the invention may be used. Therefore, the invention should not be limited to certain embodiments, but rather should be limited only by the spirit and scope of the following claims.

What is claimed:

1. A method for deploying a virtual application delivery controller, the method comprising:
    (a) performing, by one or more application delivery controller appliances intermediary to a plurality of clients and a plurality of servers, a plurality of application delivery control functions on network traffic communicated between the plurality of clients and the plurality of servers;
    (b) deploying a virtual application delivery controller on a device intermediary to the plurality of clients and the plurality of servers; and
    (c) performing, by the virtual application delivery controller executing on the device, one or more of the plurality of application delivery control functions on network traffic communicated between the plurality of clients and the plurality of servers.

2. The method of claim 1, wherein step (b) further comprises deploying the virtual application delivery controller in a virtualized environment provided by the device.

3. The method of claim 1, wherein step (b) further comprises deploying the virtual application delivery controller to execute on a virtual machine provided by the device.

4. The method of claim 1, wherein step (b) further comprises deploying the virtual application delivery controller to execute as a virtual machine on the device.

5. The method of claim 1, wherein step (b) further comprises requesting a cloud service to execute the virtual application delivery controller on resources provided by the cloud service.

6. The method of claim 1, wherein step (b) further comprises installing the virtual application delivery controller to execute in a non-virtualized environment of the device.

7. The method of claim 1, wherein step (b) further comprises determining, by a centralized command center to deploy the virtual application delivery controller.

8. The method of claim 1, wherein step (b) further comprises configuring for deployment the one or more of the plurality of application delivery control functions for the virtual application delivery controller.

9. The method of claim 1, wherein step (c) further comprises performing, by the virtual application delivery controller, the one or more of the plurality of application delivery control functions on a first portion of network traffic concurrently to the one or more application delivery controller appliances performing the plurality of application delivery control functions on a second portion of network traffic.

10. The method of claim 1, wherein step (c) further comprises performing, by the virtual application delivery controller, a first application delivery control function on a first portion of network traffic subsequent to an application delivery controller appliance performing a second application delivery control function on the first portion of network traffic.

11. A method for managing a plurality of application delivery controllers of an application delivery network, the method comprising:
    (a) monitoring, by an application delivery fabric (ADF) manager executing on a device, an application delivery fabric (ADF) network comprising a deployment of a plurality of application delivery controllers intermediary to a plurality of a clients and a plurality of servers;
    (b) determining, by the ADF manager responsive to monitoring, that an operational or performance characteristic of the ADF network fails a corresponding threshold; and
    (c) dynamically deploying, by the ADF manager responsive to the determination, a virtual application delivery controller as part of the ADF network.

12. The method of claim 11, wherein step (a) further comprises establishing, by the ADF manager, one or more application delivery controller appliances as part of the ADF network.

13. The method of claim 11, wherein step (a) further comprises establishing, by the ADF manager, one or more virtual application delivery controllers as part of the ADF network.

14. The method of claim 11, wherein step (b) further comprises determining, by the ADF manager responsive to monitoring, that a number of users of the plurality of application delivery controllers exceeds a threshold.

15. The method of claim 11, wherein step (b) further comprises determining, by the ADF manager responsive to monitoring, that a number of connections of the plurality of application delivery controllers exceeds a threshold.

16. The method of claim 11, wherein step (b) further comprises determining, by the ADF manager responsive to monitoring, that response times of servers via the plurality of application delivery controllers exceeds a threshold.

17. The method of claim 11, wherein step (b) further comprises determining, by the ADF manager responsive to monitoring, that one of a bandwidth or transmission rates via the plurality of application delivery controllers exceeds a threshold.

18. The method of claim 11, wherein step (c) further comprises dynamically deploying the virtual application delivery controller via a cloud service.

19. The method of claim 11, further comprising undeploying a virtual application delivery controller from the ADF network responsive to monitoring.

* * * * *